US010075258B2

(12) United States Patent
Dutti et al.

(10) Patent No.: US 10,075,258 B2
(45) Date of Patent: Sep. 11, 2018

(54) DISTRIBUTING PATH DELAY DATA IN A CONNECTION-ORIENTED COMMUNICATIONS NETWORK

(75) Inventors: Enrico Dutti, Leghorn (IT); Riccardo Ceccatelli, San Miniato (IT); Stefano Ruffini, Rome (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 575 days.

(21) Appl. No.: 14/422,698

(22) PCT Filed: Aug. 22, 2012

(86) PCT No.: PCT/EP2012/066343
§ 371 (c)(1),
(2), (4) Date: Jun. 28, 2015

(87) PCT Pub. No.: WO2014/029430
PCT Pub. Date: Feb. 27, 2014

(65) Prior Publication Data
US 2015/0304066 A1 Oct. 22, 2015

(51) Int. Cl.
H04J 14/08 (2006.01)
H04J 3/06 (2006.01)
(Continued)

(52) U.S. Cl.
CPC ............. H04J 14/08 (2013.01); H04B 10/27 (2013.01); H04J 3/0647 (2013.01);
(Continued)

(58) Field of Classification Search
None
See application file for complete search history.

(56) References Cited

U.S. PATENT DOCUMENTS 5,649,108 A * 7/1997 Spiegel ................. H04L 45/10
370/400
7,130,304 B1 * 10/2006 Aggarwal ............... H04L 45/00
370/389
(Continued)

FOREIGN PATENT DOCUMENTS

CN 1852049 A 10/2006
CN 101043277 A 9/2007
(Continued)

OTHER PUBLICATIONS

PCT International Search Report, dated May 29, 2013, in connection with International Application No. PCT/EP2012/066343, all pages.
(Continued)

Primary Examiner — Xavier Szewai Wong
(74) Attorney, Agent, or Firm — Leffler Intellectual Property Law, PLLC

(57) ABSTRACT

A connection-oriented communications network comprises a plurality of interconnected nodes. A traffic path can be set up across the network. Path delay data is obtained for the traffic path by using control plane signalling messages (e.g. a Resource Reservation Protocol-Traffic Engineering, RSVP-TE signalling message) between nodes of the traffic path. The path delay data can be path delay asymmetry data indicative of an asymmetry in path delay between a forward transmission direction and a reverse transmission direction of the traffic path. Each intermediate node along the traffic path can form a signalling message for forwarding to the downstream node which includes one or more values of path delay incurred by that node, or an accumulated path delay value. The path delay can result from one or more of mapping delay, Forward Error Correction (FEC) coding and propagation delay.

18 Claims, 21 Drawing Sheets

(51) Int. Cl.
*H04L 12/26* (2006.01)
*H04B 10/27* (2013.01)
*H04L 12/721* (2013.01)

(52) U.S. Cl.
CPC ...... *H04L 43/0858* (2013.01); *H04L 43/0864* (2013.01); *H04L 45/12* (2013.01)

(56) References Cited

U.S. PATENT DOCUMENTS

| | | | | |
|---|---|---|---|---|
| 7,965,732 | B2* | 6/2011 | Rabbat | H04J 14/0227 370/438 |
| 8,855,483 | B2* | 10/2014 | Castoldi | H04J 14/0227 398/19 |
| 2004/0006613 | A1* | 1/2004 | Lemieux | H04L 47/724 709/223 |
| 2004/0264372 | A1* | 12/2004 | Huang | H04L 45/00 370/230 |
| 2008/0240077 | A1* | 10/2008 | Freiberger | H04L 43/0864 370/351 |
| 2010/0278069 | A1* | 11/2010 | Sharma | H04L 45/02 370/254 |
| 2011/0014908 | A1 | 1/2011 | Eiza et al. | |
| 2011/0143813 | A1 | 6/2011 | Ohashi | |
| 2012/0026866 | A1* | 2/2012 | Venkataraman | H04L 12/1877 370/225 |
| 2013/0235888 | A1* | 9/2013 | Bui | H04J 3/0641 370/503 |
| 2014/0079409 | A1* | 3/2014 | Ruffini | H04J 3/065 398/154 |

FOREIGN PATENT DOCUMENTS

| | | |
|---|---|---|
| CN | 102082697 A | 6/2011 |
| EP | 2 276 298 A1 | 1/2011 |
| EP | 2 408 128 A1 | 1/2012 |
| EP | 2 437 416 A2 | 4/2012 |
| EP | 2 448 168 A1 | 5/2012 |
| RU | 2133489 C1 | 7/1999 |
| RU | 2356080 C1 | 5/2009 |
| WO | 2009049207 A2 | 4/2009 |
| WO | 2009067072 A1 | 5/2009 |
| WO | 2012048975 A1 | 4/2012 |
| WO | 2012092903 A2 | 7/2012 |
| WO | 2012110109 A2 | 8/2012 |
| WO | 2013174454 A1 | 11/2013 |
| WO | 2014029430 A1 | 2/2014 |

OTHER PUBLICATIONS

Cohen, R. "PTP over MPLP draft-ronc-ptp-mpls-00.txt", Jun. 30, 2007, The IETF Trust, XP015052119, ISSN: 0000-0004, pp. 1-14.
Katz, D. et al. "Traffic Engineering (TE) Extensions to OSPF Version 2" Network Working Group RFC 3630, Sep. 2003, The Internet Society, pp. 1-14.
ITU-T Recommendation G.709/Y.1331 "Interfaces for the optical transport network" ITU-T, Feb. 2012, pp. 1-238.
IEEE Standard 1588-2008 for a Precision Clock Synchronization Protocol for Networked Measurement and Control Systems, IEEE Instrumentation and Measurement Society, New York, NY, Jul. 24, 2008, pp. 1-289.
ITU-T Recommendation G.8271/Y.1366 "Time and phase synchronization aspects of packet networks", Feb. 2012, Appendix I.6, pp. 1-5, 20-23.
Braden, R. et al. "Resource ReSerVation Protocol (RSVP)—Version 1 Functional Specification" Network Working Group RFC 2205, Sep. 1997, pp. 1-97.
European Communication dated Mar. 27, 2018 in connection with European Application No. 12751058.4, 7 pages.
X. Fu et al., "RSVP-TE extensions for latency and loss traffic engineering application; draft-fuxh-ccamp-delay-loss-rsvp-te-ext-00", Internet Engineering Task Force, IETF; Standard Working Draft, Internet Society (ISOC) 4, Rue Des Falaises CH-1205 Geneva, Swit6zerland, Jul. 4, 2011, pp. 1-14.
Chinese Office Action, dated Mar. 27, 2017, in connection with Chinese Application No. 201280076562.3, all pages.
English language translation of Chinese Office Action, dated Mar. 27, 2017, in connection with Chinese Application No. 201280076562.3, all pages.
English language translation of Chinese Search Report dated Mar. 27, 2017, in connection with Chinese Application No. 201280076562.3, all pages.
PCT International Search Report, dated May 14, 2013, in connection with International Application No. PCT/EP2012/068774, all pages.
Ericsson "Discussion on CPRI over OTN Sync Requirements" ITU-T Draft, vol. 13, Sep. 21, 2010, pp. 1-6, XP017448601.
CPRI Specification V5.0 "Common Public Radio Interface (CPRI); Interface Specification", Sep. 21, 2011, pp 1-119.
ITU-T Standard G.709N.1331 "Interfaces for the Optical Transport Network" Feb. 2012, pp. 1-232.
S. Davari et al., Transporting PTP messages (1588) over MPLS Networks, Sep. 22, 2010, 12 pages.
Chongning NA et al., Synchronization Performance of the Precision Time Protocol, 2007 International IEEE Symposium on Precision Clock Synchronization (ISPCS) for Measurement, Control and Communication, Vienna, Austria, Oct. 1-3, 2007, 8 pages.
Junfang Wang et al., 1588v2 transmission by OSC over OTN, FH Corporation.CATR.ATE Corporation, Shenzhen, Oct. 18-22, 2010, 3 pages.
IEEE Standard for a Precision Clock Synchronization Protocol for Networked Measurement and Control Systems, IEEE Instrumentation and Measurement Society, XP-002588173, IEEE Std 1588-2008, Jul. 24, 2008, part 1 pp. 1-144.
IEEE Standard for a Precision Clock Synchronization Protocol for Networked Measurement and Control Systems, IEEE Instrumentation and Measurement Society, XP-002588173, IEEE Std 1588-2008, Jul. 24, 2008, part 2 pp. 145-287.
ITU-T Recommendation G.709/Y.1331, Interfaces for the Optical Transport Network (OTN), ITU-T, Dec. 2009, 218 pages.
ITU, Telecommunication Standardization Sector, COM 15-C 1451-E, Analysis of phase/time distribution over OTN networks, France Telecom, Feb. 2011, 6 pages.
Chinese Search Report, dated Mar. 22, 2017, in connection with Chinese Application No. 2012800769111, all pages.
English translation of Chinese Office Action, dated Apr. 1, 2017, in connection with Chinese Application No. 2012800769111, all pages.
English translation of Chinese Office Action Summary, dated Apr. 1, 2017, in connection with Chinese Application No. 2012800769111, all pages.

* cited by examiner

Control plane signalling:
RSVP-TE path message flow

Control plane signalling:
RSVP-TE resv message flow

Ingress node N1, 11

Option 1: node N1 computes new accumulated path delay (asymmetry) value

Option 2: node N1 adds to string of path delay (asymmetry) data

Intermediate node 13 (e.g. N2)

Option 1: each node computes new accumulated path delay (asymmetry) value

Option 2: each node adds to string of path delay data

Egress node N5, 12

Option 1: node N5 computes new accumulated path delay value

Option 2: node adds to string of path delay data

```
0              1              2              3
+-------------+-------------+-------------+-------------+
|       Length (bytes)      |  Class-Num  |   C-Type    |
+-------------+-------------+-------------+-------------+
|                                                       |
//                   (Object contents)                 //
|                                                       |
+-------------+-------------+-------------+-------------+
```

Fig. 7A

```
0              1              2              3
+-------------+-------------+-------------+-------------+
|       Length = 8          |     188     |      1      |
+-------------+-------------+-------------+-------------+
|         Circuit asymmetry expressed in psec           |
+-------------+-------------+-------------+-------------+
```

Fig. 7B

DISTRIBUTING PATH DELAY DATA IN A CONNECTION-ORIENTED COMMUNICATIONS NETWORK

TECHNICAL FIELD

This invention relates to obtaining and distributing path delay data in a connection-oriented communications network, such as an optical communications network.

BACKGROUND

There are a number of applications requiring accurate frequency and/or time synchronisation references in order to properly operate. In case of frequency synchronisation a traditional solution has been to obtain synchronisation from a synchronous stream of data, as for instance in the case of Time-Division Multiplexed (TDM) based networks.

Migration of networks from TDM to packet-based technologies, such as Ethernet, requires a different approach to synchronisation. One approach to performing synchronisation across a packet based network is to send packets across the network which carry timestamp information. The timestamps are generated by a master (server) that has access to an accurate reference, such as Global Positioning System (GPS). It is possible to provide time synchronisation between a pair of nodes by using a timing protocol such as the Network Time Protocol (NTP) or Precision Time Protocol (PTP), defined in IEEE 1588. A master node with access to an accurate time source (e.g. GPS) provides a timestamp and the protocol determines the transfer delay between the master node and the slave node. One fundamental assumption with this approach is that the delay from master to slave and from slave to master is identical. This means that any asymmetry in the network would significantly impact the performance of the delivered time synchronisation reference.

An asymmetry in propagation delay can occur where forward traffic and reverse traffic (and therefore forward PTP signals and reverse PTP signals) is subject to different transmission characteristics. In an optical communications network, forward and reverse traffic may be carried by different links, having different transmission characteristics. Even in the case where forward traffic and reverse traffic are carried over the same link, the use of different wavelengths for the forward and reverse traffic can cause an asymmetry in propagation delay.

A known solution to correct for asymmetries in the links is to manually calibrate the links. If the delay asymmetry of the path connected to the ingress port is known, the corrections can be made as specified by the PTP protocol. However, this must be performed node-by-node and can be an extremely costly and time consuming process. Moreover, at any change in the network (e.g. adding transmission equipments) the compensation has to be updated. This can be a too complex and costly task creating a significant obstacle in the deployment of IEEE 1588 technology.

One proposal to distribute asymmetry information is to flood asymmetry data across a network by using Open Shortest Path First (OSPF). This can require a large amount of data and can cause scalability issues.

SUMMARY

An aspect of the invention provides a method of distributing path delay data across a connection-oriented communications network comprising a plurality of interconnected nodes. The method comprises, at an intermediate node of a traffic path across the network, receiving a signalling message from an upstream node of the traffic path which comprises path delay data indicative of path delay incurred by at least the upstream node of the traffic path. The method further comprises acquiring path delay data indicative of a path delay for the traffic path incurred by at least one of the intermediate node and a link connecting the intermediate node to another node. The method further comprises forming a signalling message comprising the path delay data indicative of a path delay incurred by at least one of the intermediate node and a link connecting the intermediate node to another node. The method further comprises sending the signalling message to a downstream node of the traffic path.

Another aspect of the invention provides a method of distributing path delay data across a connection-oriented communications network comprising a plurality of interconnected nodes. The method comprises, at an ingress node of a traffic path across the network, acquiring path delay data indicative of a path delay for the traffic path incurred by at least one of the ingress node and a link connecting the ingress node to another node. The method further comprises forming a signalling message which comprises the path delay data. The method further comprises sending the signalling message only to a downstream node of the traffic path.

Another aspect of the invention provides a method of distributing path delay data across a connection-oriented communications network comprising a plurality of interconnected nodes. The method comprises, at an egress node of a traffic path across the network, receiving a signalling message from an upstream node of the traffic path comprising path delay data indicative of path delay incurred by at least the upstream node. The method further comprises acquiring path delay data indicative of a path delay for the traffic path incurred by at least one of the egress node and a link connecting the egress node to another node. The method further comprises forming a signalling message comprising the path delay data indicative of a path delay incurred by at least one of the egress node and a link connecting the egress node to another node. The method further comprises sending the signalling message to the upstream node of the traffic path.

An advantage of an embodiment of the invention is that path delay data is distributed in a manner which minimises the amount of data sent over a control plane of the network. Path delay data is distributed by forwarding the data between the nodes involved in a traffic path. This minimises the amount of message processing required at nodes and allows the network to more readily scale to support a larger number of traffic paths. In comparison, use of a flooding protocol such as OSPF to distribute asymmetry data can require a large number of nodes to process asymmetry data as part of the flooding mechanism, even if those nodes have no interest in the asymmetry data.

The term "path delay data" includes path delay asymmetry data which is indicative of an asymmetry (i.e. difference) in path delay between a forward transmission direction and a reverse transmission direction of the traffic path. In time synchronisation applications where a master node and a slave node participate in a timing synchronisation protocol (e.g. PTP), knowledge of the path delay asymmetry can be used by the slave node to achieve a more accurate time synchronisation with the master node. The method can be performed in a server network, which is used to carry traffic between a master node and a slave node which form part of one or more client networks.

The path delay can arise from one or more of: mapping/multiplexing data (e.g. mapping Ethernet packets into OTN containers for transport over an OTN or multiplexing OTN units); performing forward error correction (at ingress or egress); propagation along a network link.

Advantageously, the signalling message is a Resource Reservation Protocol-Traffic Engineering (RSVP-TE) control plane signalling message.

The path delay data carried in a signalling message can be an accumulated path delay for the traffic path. Each node along the traffic path can determine a new accumulated path delay based on the accumulated path delay data in the received signalling message and a path delay incurred by the intermediate node.

In an alternative embodiment, the path delay data can comprise a set of separate information elements, which indicate a path delay incurred by a node and/or a path delay incurred by a link between nodes.

The method can be used at the time of establishing a traffic path and/or at subsequent times after establishing a traffic path, such as when a protection switch or recovery operation is performed on the traffic path or any other event which may cause a change in path delay data.

Advantageously, the method can provide an improved performance in OTN networks which are subject to variable delays related to use of asynchronous clocks.

Advantageously, where the network comprises a source of variable path delay due to justification events caused by mapping signals (e.g. an OTN network), a period between iterations of the method is less than a period between justification events occurring in the network.

Advantageously, the method further comprises determining information about behaviour of the variable path delay during the period between iterations of the method. This information can be used to further improve the accuracy of clock synchronisation at a slave node.

Any of the methods can be used in applications which use a time synchronisation protocol such as the Precision Time Protocol (PTP) defined in IEEE1588 or the Network Time Protocol (NTP), or in general delay measurements required in interfaces such as the Common Public Radio Interface (CPRI).

Further aspects of the invention further provide apparatus for implementing any of the described or claimed methods. In particular, an aspect of the invention provides apparatus for use at an intermediate node of a traffic path in a connection-oriented communications network comprising a plurality of interconnected nodes. The apparatus comprises an interface for communicating with other nodes of the traffic path. The apparatus further comprises control logic which is arranged to receive a signalling message from an upstream node of the traffic path which comprises path delay data indicative of path delay incurred by at least the upstream node of the traffic path. The control logic is further arranged to acquire path delay data for the traffic path indicative of a path delay incurred by at least one of the intermediate node and a link connecting the intermediate node to another node. The control logic is further arranged to form a signalling message comprising the path delay data indicative of a path delay incurred by at least one of the intermediate node and a link connecting the intermediate node to another node. The control logic is further arranged to send the signalling message to a downstream node of the traffic path.

Another aspect of the invention provides apparatus for use at an ingress node of a traffic path in a connection-oriented communications network comprising a plurality of interconnected nodes. The apparatus comprises an interface for communicating with other nodes of the traffic path. The apparatus further comprises control logic which is arranged to acquire path delay data for the traffic path indicative of a path delay incurred by at least one of the ingress node and a link connecting the ingress node to another node. The control logic is further arranged to form a signalling message which comprises the path delay data. The control logic is further arranged to send the signalling message only to a downstream node of the traffic path.

Another aspect of the invention provides apparatus for use at an egress node of a traffic path in a connection-oriented communications network comprising a plurality of interconnected nodes. The apparatus comprises an interface for communicating with other nodes of the traffic path. The apparatus further comprises control logic which is arranged to receive a signalling message from an upstream node of the traffic path comprising path delay data indicative of path delay incurred by at least the upstream node. The control logic is further arranged to acquire path delay data for the traffic path indicative of a path delay incurred by at least one of the egress node and a link connecting the egress node to another node. The control logic is further arranged to form a signalling message comprising the path delay data indicative of a path delay incurred by at least one of the egress node and a link connecting the egress node to another node. The control logic is further arranged to send the signalling message to the upstream node of the traffic path.

Another aspect of the invention provides a method performed at a node of a traffic path comprising receiving a request to provide path delay data. The method further comprises acquiring path delay data indicative of a path delay incurred by at least one of the node and a link connecting the node to another node. The method further comprises forming a signalling message which comprises the path delay data and sends the signalling message.

Another aspect of the invention provides a method performed at a network entity comprising sending a request to a node of a traffic path to provide path delay data. The method further comprises receiving a signalling message from the node which carries path delay data indicative of a path delay incurred by at least one of the node and a link connecting the node to another node.

Another aspect of the invention provides apparatus for use at a node of a connection-oriented communications network comprising an interface for communicating with a network entity. The apparatus further comprises control logic which is arranged to: receive a request from the network management entity to provide path delay data; acquire path delay data indicative of a path delay incurred by at least one of the node and a link connecting the node to another node; form a signalling message which comprises the path delay data; and send the signalling message to the network entity.

Another aspect of the invention provides apparatus for use at a network entity of a connection-oriented communications network comprises an interface for communicating with the nodes of the network. The apparatus further comprises control logic which is arranged to: send a request to a node of a traffic path to provide path delay data; receive a signalling message from the node which carries path delay data indicative of a path delay incurred by at least one of the node and a link connecting the node to another node.

The "network entity" recited above can be a network management entity or an ingress node of the traffic path.

The functionality described here can be implemented in hardware, software executed by a processing apparatus, or by a combination of hardware and software. The processing apparatus can comprise a computer, a processor, a state machine, a logic array or any other suitable processing apparatus. The processing apparatus can be a general-purpose processor which executes software to cause the general-purpose processor to perform the required tasks, or the processing apparatus can be dedicated to perform the required functions. Another aspect of the invention provides machine-readable instructions (software) which, when executed by a processor, perform any of the described methods. The machine-readable instructions may be stored on an electronic memory device, hard disk, optical disk or other machine-readable storage medium. The machine-readable medium can be a non-transitory medium. The machine-readable instructions can be downloaded to the storage medium via a network connection.

BRIEF DESCRIPTION OF THE DRAWINGS

Embodiments of the invention will be described, by way of example only, with reference to the accompanying drawings in which:

FIGS. 7A and 7B show a control plane RSVP-TE signalling message to carry path delay data;

DETAILED DESCRIPTION

Figure 1:
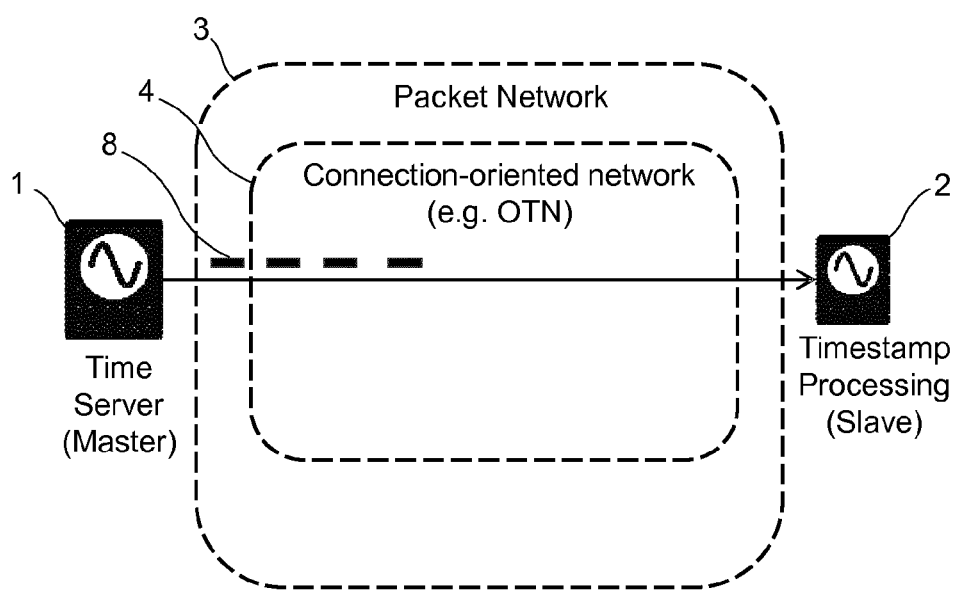
FIG. 1 shows a communication system with time synchronisation between nodes.

FIG. 1 shows a system in which embodiments of the invention may be used. A first node 1 has a clock which provides an accurate timing reference. The first node 1 may have access to a source of accurate timing information, such as a Global Positioning System (GPS) receiver. A second node 2 has a local clock which is synchronised to the clock of the first node 1. Timing information carried in packets 8 sent between the first node 1 and second node 2 allows the second node 2 to synchronise the local clock at the second node 2 with the clock at the first node 1. A packet network 3, such as an Ethernet network, connects the first node 1 and the second node 2. Timing information can comprise timestamps. Packets are transported across a connection-oriented network 4 for at least part of the path between the first node 1 and the second node 2. An Optical Transport Network (OTN) will be described as an example of a connection-oriented network. A time protocol such as PTP is used to synchronise a clock at node 2 to a clock at node 1. The time protocol determines an estimate of propagation delay between the master and slave, and assumes that propagation delays in the forward and reverse directions are equal. Node 2 receives information about the asymmetry (i.e. difference) between propagation delays in the forward and reverse directions which allows node 2 to compensate for any asymmetry between the forward and reverse directions.

Figure 2:
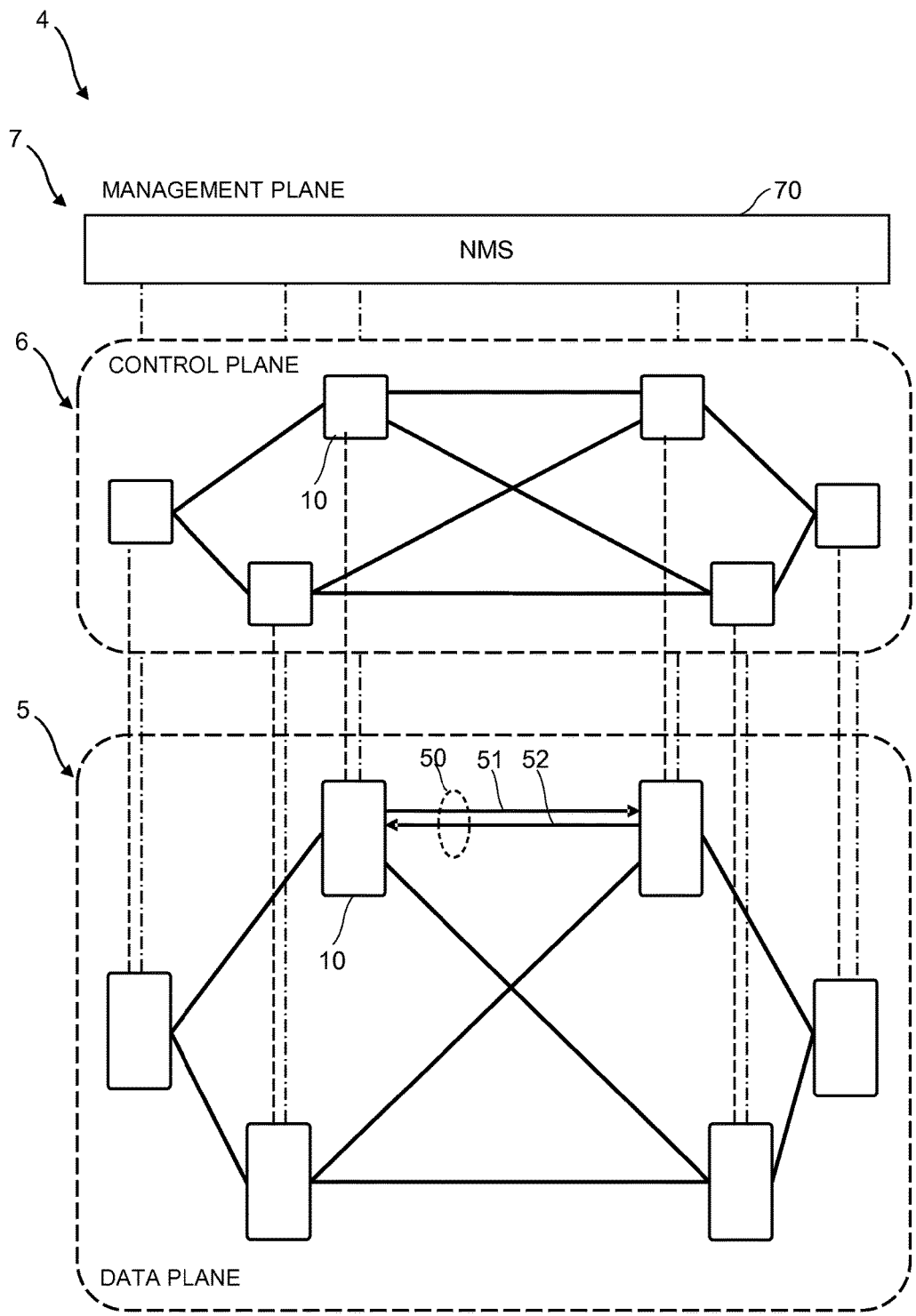
FIG. 2 shows a connection-oriented communications network which can form part of the system of FIG. 1.

FIG. 2 shows the Optical Transport Network 4 in more detail. Network 4 comprises nodes 10. The network 4 comprises a data plane 5, a control plane 6 and a management plane 7. Traffic-carrying paths are established between nodes 10 in the data plane 5 for carrying traffic across the network. Adjacent nodes 10 of the network are connected by links 50 (e.g. optical fibres). A separate link (e.g. optical fibre) 51, 52 can be provided for each direction of communication: a first link 51 for carrying traffic in the forward direction of communication and a second link 52 for carrying traffic in the reverse direction of communication. Each link can be a separate fibre which can follow a physically separate path. Traffic is carried on links 51, 52 by wavelength channels, which are also called lambdas. Each lightpath uses a different wavelength channel within a defined spectral band. This type of network uses a fixed or flexible grid of wavelength division multiplexed (WDM) or densely wavelength division multiplexed (DWDM) optical channels for lightpaths. At the source node and destination node of a lightpath there are optical transceivers for optically transmitting traffic on lambdas and for optically receiving traffic on lambdas. Advantageously, a node comprises an optical cross-connect which is arranged to forward traffic based on wavelength of the lambda. This is generally known as Wavelength Switched Optical Network. The network can have a meshed, ring or any other suitable topology.

In use, traffic paths are established in the data plane 5 between nodes 10 of the network 4. A traffic path can be formed between an ingress node and an egress node, via one or more intermediate nodes. Paths are set-up and torn down by control plane signalling, such as Generalised Multi-Protocol Label Switching signalling. The term "traffic path" can be a Label Switched Path (LSP). In FIG. 2 the control plane is schematically shown as a separate layer 6 of the network 4, as it can use different resources compared to the data plane 5, such as using a separate fibre or wavelength compared to the traffic path to which the signalling relates. The GMPLS control plane signalling comprises Resource Reservation Protocol-Traffic Engineering (RSVP-TE) signalling which is typically used to set up and tear down traffic paths. Network 4 can also comprise a management plane 7, which is represented in FIG. 2 by a Network Management System (NMS) 70. Nodes 10 can communicate with the NMS 70 via a management plane interface.

Figure 3A:
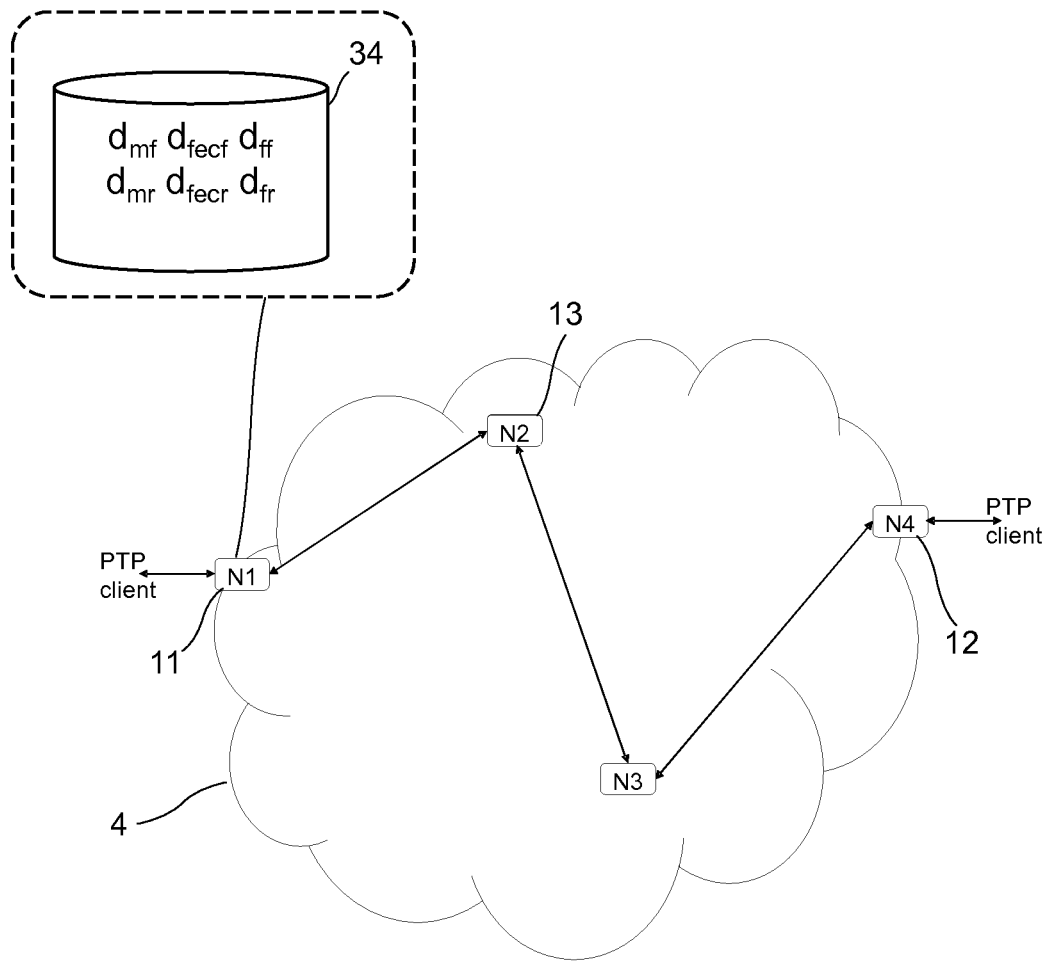
FIG. 3A shows a traffic path across a communications network between an ingress node and an egress node.

FIG. 3A shows a set of the nodes 10 of the network 4 of FIG. 2 which are connected to form a traffic path. Node N1 will be called the ingress node, node N5 will be called the egress node and nodes N2, N3 will be called intermediate nodes. Once established, a bi-directional traffic path between nodes N1 and node N4 has a forward path and a reverse path.

Each node N1-N4 collects path delay data which is indicative of path delay incurred at that node and holds the path delay data in a store 34. One form of path delay is mapping delay. This can occur when Ethernet packets/frames are mapped to OTN containers and when Ethernet packets/frames are de-mapped from OTN containers. This delay can be related to the depth of FIFOs where the Ethernet client is mapped. Mapping delay in the forward direction will be called $d_{mf}$ and mapping delay in the reverse direction will be called $d_{mr}$. In this specification the term "mapping" also includes multiplexing/de-multiplexing OTN containers between different OTN levels.

Another form of path delay is processing delay which results from Forward Error Correction (FEC) or Adaptive Forward Error Correction (AFEC) coding. This can be related to the depth of the FEC/AFEC coding buffer which can be used to calculate the additional delay related to this second process (when applicable). Coding delay in the forward direction will be called $d_{fecf}$ and coding delay in the reverse direction will be called $d_{fecr}$.

Propagation delay resulting from propagation across an optical fibre between a first node and a second node can be known by a node. (Fibre) propagation delay in the forward direction will be called $d_{ff}$ and propagation delay in the reverse direction will be called $d_{fr}$. An asymmetry in propagation delay can arise where traffic in a forward direction and traffic flowing in a reverse direction use different fibres with different transmission characteristics (e.g. fibre length, wavelength). An asymmetry in propagation delay can arise where traffic in a forward direction and traffic flowing in a reverse direction use the same fibre but different wavelengths, with forward traffic using a first wavelength and reverse traffic using a second wavelength. Propagation delay between a pair of nodes can be calculated in various ways known in the art. One exemplary method is described in ITU-T G.8271 in Appendix I.6.

Other types of delay can be measured and/or stored by a node. Some of the types of delay may only occur at particular nodes. For example, mapping delay may only occur at an ingress node where traffic is mapped into OTN containers and at an egress node where traffic is removed from OTN containers. However, if intermediate nodes perform multiplexing/demultiplexing for OTN traffic consolidation (e.g. mapping lower order data units into higher order data units) then further mapping delays may occur at intermediate nodes. FEC delay may occur at ingress nodes and egress nodes. FEC delay may also occur at an intermediate node where regeneration of an optical signal is performed and there is opto-electro-opto conversion.

For an application such as time synchronisation, the asymmetry in path delay between the forward path and reverse path is required by a node which performs time synchronisation. The asymmetry at each node (plus forward and reverse fibres connected to that node) can be calculated from the component delays described above, as:

$$A=(d_{mf}+d_{fecf}+d_{ff})-(d_{mr}+d_{fecr}+d_{fr})$$

For the full traffic path between node N1 and N4, the path delay (or asymmetry in path delay) of each node N1-N4 and links between nodes N1-N4 are required. In accordance with embodiments of the invention, path delay data is collected from the nodes N1-N4 forming a traffic path across network 4. The collected data can then be used by a node which requires the path delay data or path delay asymmetry data.

Several possible ways in which path delay can be collected are now described.

Collecting an Accumulated Path Delay (Path Delay Asymmetry)

A control plane signalling message (e.g. an RSVP-TE Path message) is forwarded, via the control plane 6, from the ingress node N1, via intermediate nodes N2, N3, to the egress node N4 of the traffic path. At each node, the node calculates a new accumulated value of path delay (path delay asymmetry) based on the value of path delay received in the message from the upstream node and the value of the path delay contributed by that node. The node then forwards a signalling message to the next downstream node with the new accumulated value. The egress node N4 receives a message with an accumulated value representing the path delay (path delay asymmetry) contributed by all of nodes N1-N3. Node N4 can then add the path delay (path delay asymmetry) contribution of node N4 to provide a final accumulated path delay (path delay asymmetry) value. Egress node N4 then returns a signalling message (e.g. an RSVP-TE Resv message) with the total accumulated path delay (path delay asymmetry) value along the sequence of nodes N4-N3-N2-N1 of the traffic path. Egress node N4 can signal the accumulated path delay value to another network or network entity, or ingress node N1 can signal the accumulated path delay value to another network or network entity.

Figure 3B:
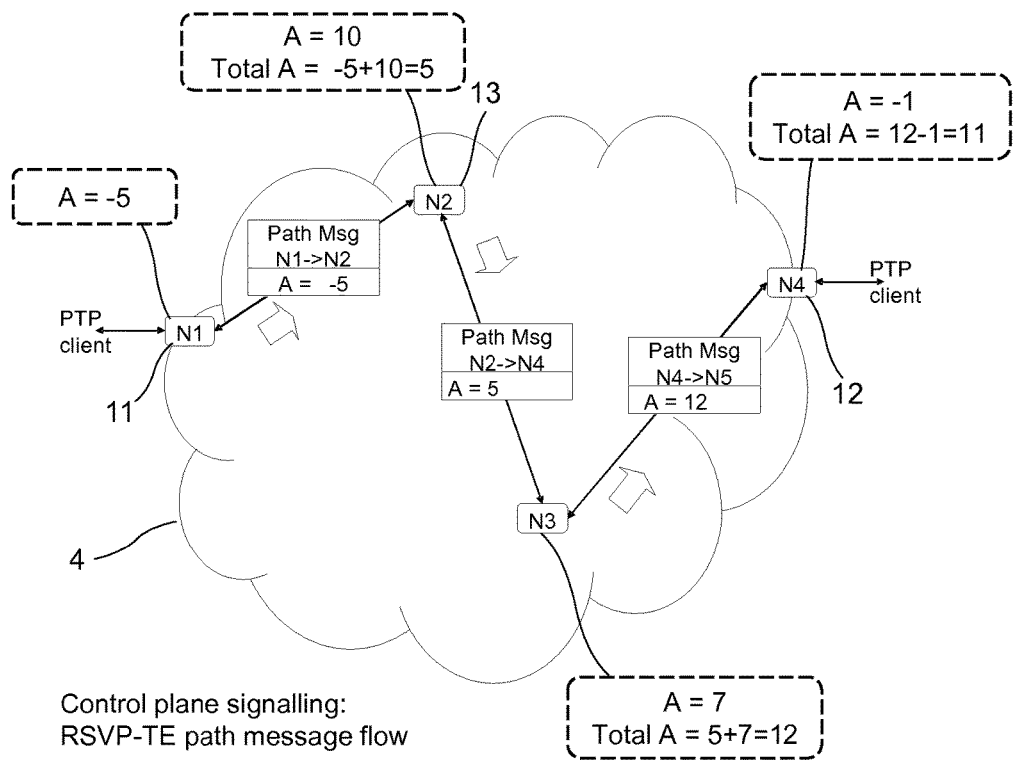
FIGS. 3B and 3C show signalling between nodes of the traffic path of FIG. 3A to distribute path delay data.
Figure 3C:
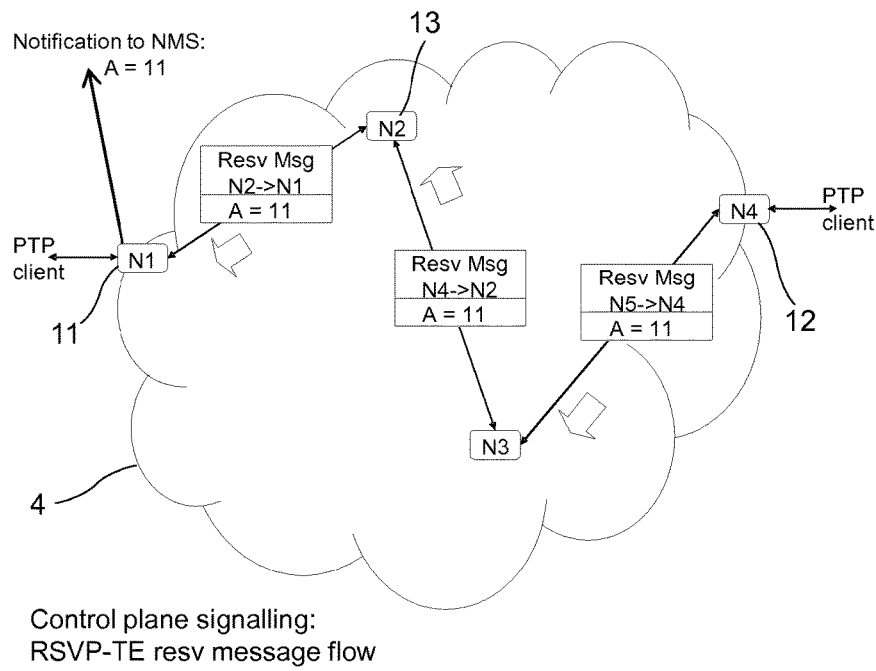

FIGS. 3B and 3C show an example of this method. In this example, the quantity which is collected and signalled is a path delay asymmetry value, but the quantity could be path delay. Starting with FIG. 3B, ingress node N1 contributes a path delay asymmetry of −5 (i.e. the path delay in the forward direction is shorter than the path delay in the reverse direction by 5 units, where a unit can equal a picosecond, ps). Ingress node N1 sends an RSVP-TE Path message to node N2 via the control plane 6 reporting the value "−5". Node N2 contributes a path delay asymmetry of +10 (i.e. the path delay in the forward direction is longer than the path delay in the reverse direction by 10 units). Node N2 calculates a new accumulated path delay asymmetry value based on the received data value (−5) and the path delay data of the node (10). The calculation is −5+10=5, and sends an RSVP-TE Path message to node N3 via the control plane reporting the value "+5". Node N3 contributes a path delay asymmetry of +7 (i.e. the path delay in the forward direction is longer than the path delay in the reverse direction by 7 units). Node N3 calculates a new accumulated path delay asymmetry value based on the received data value (+5) and the path delay data of the node (+7). The calculation is of 5+7=12, and sends an RSVP-TE Path message to node N4 via the control plane reporting the value "+12". Node N4 contributes a path delay asymmetry of −1 (i.e. the path delay in the forward direction is shorter than the path delay in the reverse direction by 1 unit). Node N4 calculates a new accumulated path delay asymmetry value of 12−1=11. Node N4 can report this value to another node (e.g. a node in a client network connected to node N4). FIG. 3C shows the reverse signalling path. Egress node N4 sends an RSVP-TE Resv message to node N3 via the control plane reporting the value "+11". The message is forwarded via nodes N3 and N2 to ingress node N1. Node N1 can report the value to another node, such as the NMS 70.

Collecting Component Path Delays (Path Delay Asymmetries)

A control plane signalling message (e.g. an RSVP-TE Path message) is forwarded, via the control plane, from the ingress node N1, via intermediate nodes N2, N3, to the egress node N4 of the traffic path. At each node, the node adds a path delay (path delay asymmetry) contributed by that node and forwards a message to the next node. The egress node N4 receives a signalling message with a list of component path delays (path delay asymmetries) contributed by each of the nodes N1-N3 of the traffic path. Node N4 can then add the path delay (path delay asymmetry) contribution of node N4 to the list of values. Egress node N4 then returns a signalling message (e.g. an RSVP-TE Resv message) along the sequence of nodes N4-N3-N2-N1 of the traffic path. Egress node N4 can signal the accumulated path delay value to another network, or ingress node N1 can signal the accumulated path delay value to another network. Each node N1-N4 of the traffic path can contribute a single value, representing a sum of all of the sources of path delay at the node (or an overall path delay asymmetry), or it can forward a set of values, representing each source of path delay (path delay asymmetry), such as separate values for each of mapping delay, FEC delay, propagation delay.

Collecting Path Delay Data Over Forward and Reverse Paths

In the options described above, a control plane signalling message (e.g. an RSVP-TE Path message) is forwarded, via the control plane, from the ingress node N1, via intermediate nodes N2, N3, to the egress node N4 of the traffic path. During the forward passage of the signalling message, each node of the traffic path contributes one or more path delay values indicative of the forward and reverse path delay at that node. By the time the signalling message reaches the egress node N4, the signalling message contains all of the path delay data for forward and reverse paths (or path delay asymmetry between forward and reverse paths) for the entire traffic path N1-N4. The signalling message received at egress node N4 will either comprise a single accumulated value of path delays (path delay asymmetries) contributed by nodes, or a list of component path delays (path delay asymmetries). In an alternative method, each node only contributes a forward path delay as the signalling message is sent in the forward direction between node N1 and node N4, and contributes a reverse path delay as the signalling message is sent in the reverse direction between node N4 and node N1. For example, node N2 could contribute a value of "+5" units, representing the forward path delay at node N2, as a signalling message is received from N1 (travelling in the forward direction towards node N4), and could contribute a value of "+2" units, representing the reverse path delay at node N2, as a signalling message is received from node N3 (travelling in the reverse direction towards node N1).

In each of the alternatives described above a node N1-N4 can have many different traffic paths passing via the node and the path delay (asymmetry) can be different for each traffic path. For example, the delay may differ due to different mapping techniques or traffic loads, different FEC types, or links which differ in length and/or wavelength. The signalling message (e.g. RSVP-TE message) contains data which identifies the traffic path (Label Switched Path, LSP). During a setup phase of a traffic path each node relates an LSP identifier to physical resources used by that traffic path and the related processing. This is implementation dependent but, for example, each LSP can be related to one upstream and one downstream port (with, for example, relevant delays associated to the fibre length) and the data that is associated to the LSP is processed in some LSP-specific way (for example with an appropriate multiplexing/demultiplexing). The method performed at a node N1-N4 can comprise: the node receiving the signalling message; the node identifying the traffic path (LSP) that the message relates to; the node recovers the list of resources the LSP is related to; and the node checks the path delay data (path delay asymmetry data) related to the use of the resources that have been identified.

In each of the alternatives described above, one of the possible sources of path delay is propagation delay due to passage over an optical fibre link, or an asymmetry in propagation delay over forward and reverse paths over a bi-directional link, or a pair of forward and reverse links The propagation delay can either be contributed by the node at the start of the link, or by the node at the end of the link (when viewed in the direction from ingress node to egress node). For example, in FIG. 3B, node N1 can contribute propagation delay for the link between nodes N1 and N2, or an asymmetry in propagation delay between forward and reverse paths over a bi-directional link, or a pair of forward and reverse links, between nodes N1 and N2. Similarly, node N2 can contribute propagation delay for the link between nodes N2 and N3, and node N3 can contribute propagation delay for the link between nodes N3 and N4. Alternatively, node N2 can contribute propagation delay for the link between nodes N1 and N2, node N3 can contribute propagation delay for the link between nodes N2 and N3, and node N4 can contribute propagation delay for the link between nodes N3 and N4. Advantageously, each node follows the same convention.

Advantageously, a node has the capability to compute a path delay based on measurements made by the node. If a node does not have this capability, then it is possible that the node can send measurements, or the results of intermediate calculations, to another node, and for another node to perform the calculation. The term "path delay data" can include data acquired by a node which will allow another node to calculate a path delay, or path delay asymmetry. The data can be carried in a field of the signalling message which is forwarded between nodes of the traffic path.

Figure 4A:
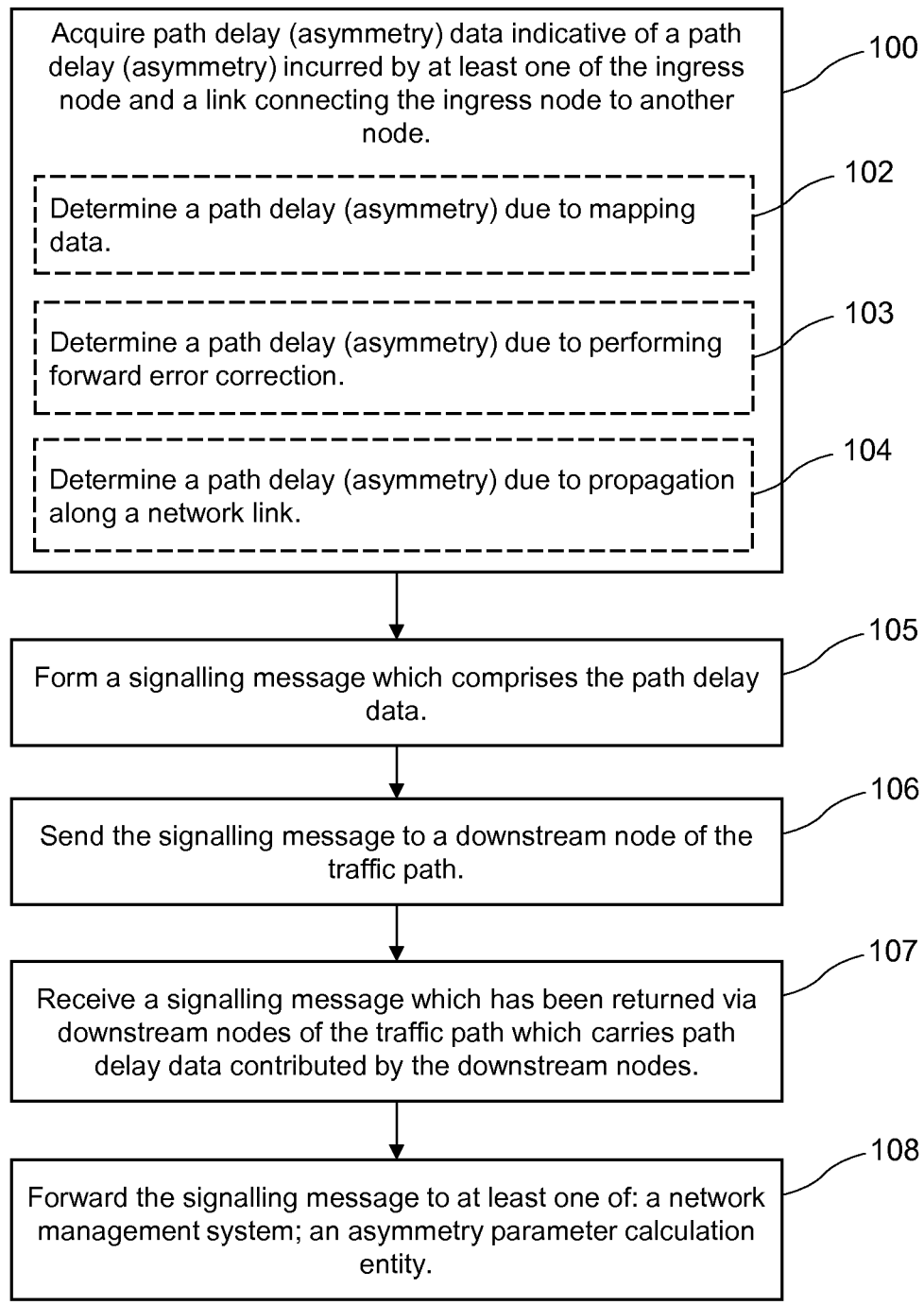
FIG. 4A shows a method performed by an ingress node.
Figure 4B:
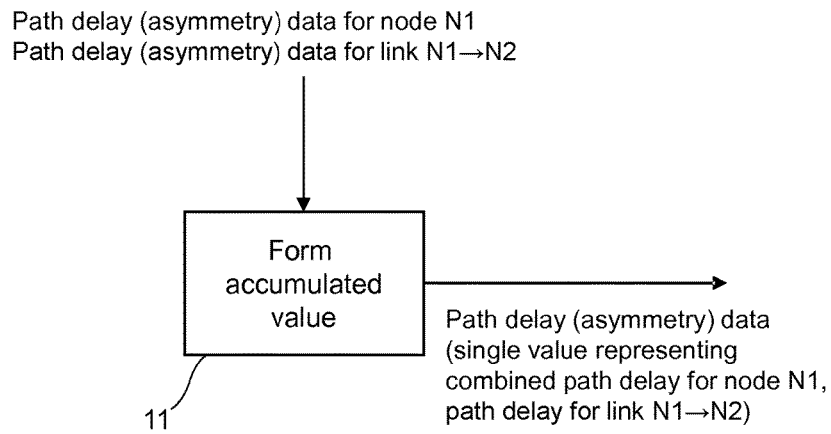
FIGS. 4B and 4C show operations performed by an ingress node.
Figure 4C:
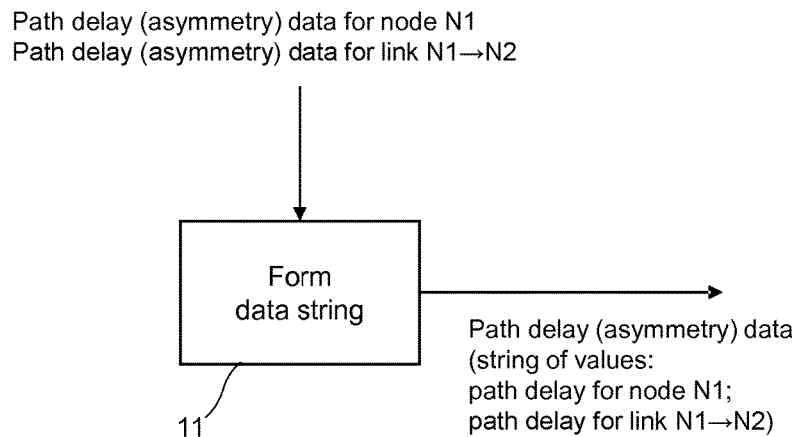

FIGS. 4A-4C show the method performed at an ingress node N1, 11. At step 100 of the method, the ingress node acquires path delay (asymmetry) data indicative of a path delay (asymmetry) incurred by at least one of the ingress node and a link connecting the ingress node to another node. Step 100 can comprise a step 102 of determining a path delay (asymmetry) due to mapping data. Step 100 can comprise a step 103 of determining a path delay (asymmetry) due to performing forward error correction. Step 100 can comprise a step 104 of determining a path delay (asymmetry) due to propagation along a network link. A node may already have the path delay data at the time of setting up a traffic path. Alternatively, the path delay data can be computed after the path is set up, and distributed during a subsequent exchange of signalling messages between nodes of the traffic path. For example, some quantities (e.g. mapping delay) may only be known once a node begins to process data of the traffic path.

Step 105 of the method forms a signalling message which comprises the path delay data. Step 106 of the method sends the signalling message to a downstream node of the traffic path. This is the next node (N2) along the traffic path.

The method can comprise a step 107 of receiving a signalling message which has been returned via downstream nodes of the traffic path which carries path delay data contributed by the downstream nodes. This corresponds to FIG. 3C, where a RSVP-TE Resv message is returned via nodes of the traffic path. At step 108 the ingress node forwards the signalling message to at least one of: a network management system; an asymmetry parameter calculation entity.

Figure 5A:
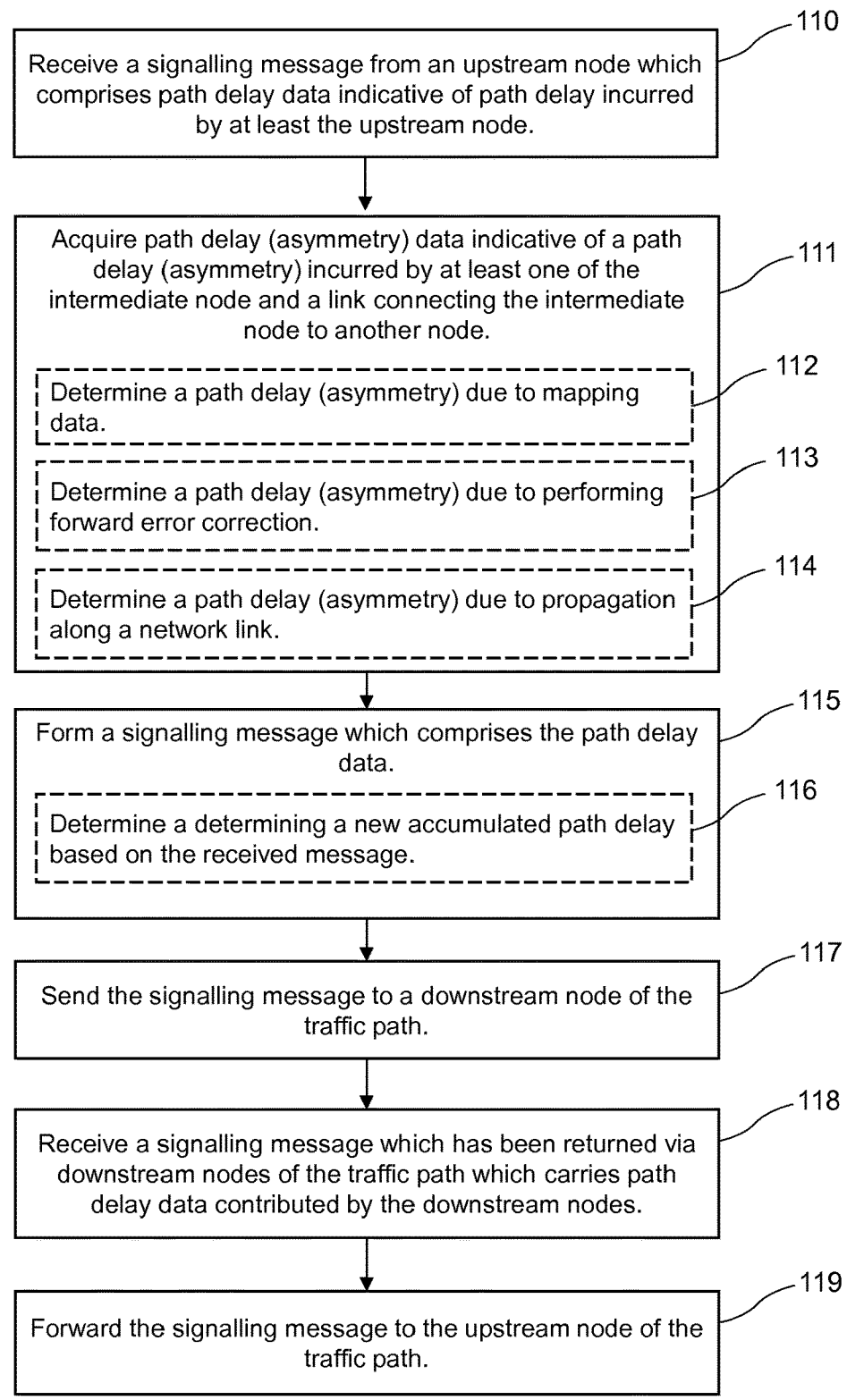
FIG. 5A shows a method performed by an intermediate node.
Figure 5B:
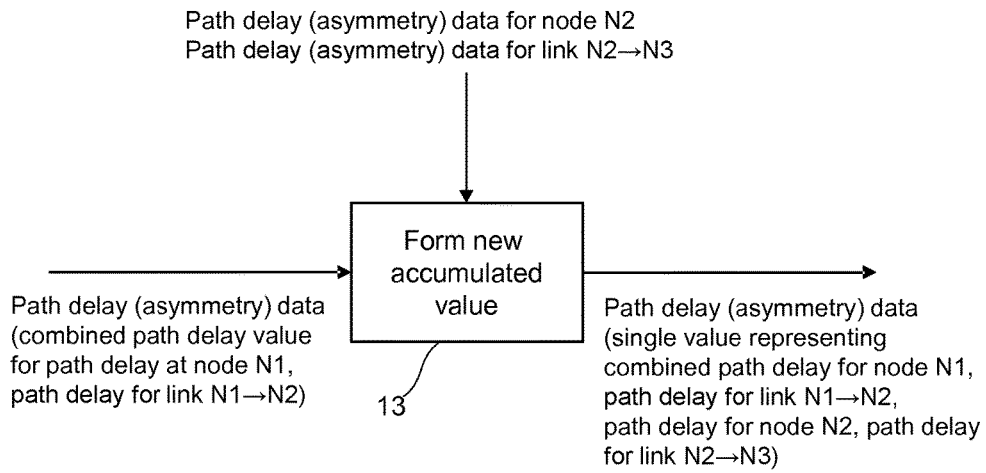
FIGS. 5B and 5C show operations performed by an intermediate node.
Figure 5C:
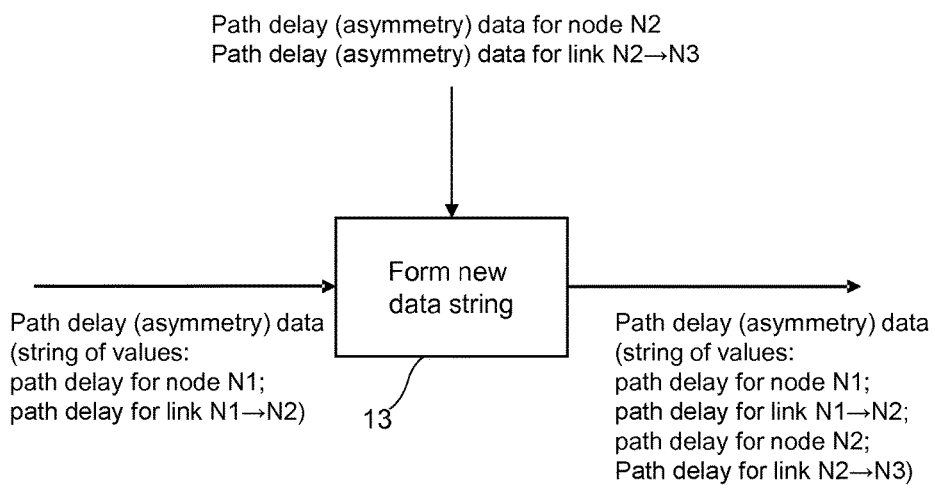

FIGS. 5A-5C show the method performed at an intermediate node N2, N3, 13. At step 110 of the method the node receives a signalling message from an upstream node of the traffic path which comprises path delay data indicative of path delay incurred by at least the upstream node. At step 111, the node acquires path delay (asymmetry) data indicative of a path delay (asymmetry) incurred by at least one of the intermediate node and a link connecting the intermediate node to another node. Step 111 can comprise a step 112 of determining a path delay (asymmetry) due to mapping data. Step 111 can comprise a step 113 of determining a path delay (asymmetry) due to performing forward error correction. Step 111 can comprise a step 114 of determining a path delay (asymmetry) due to propagation along a network link.

Step 115 forms a signalling message which comprises the path delay data. Step 115 can comprise a step 116 of determining a new accumulated path delay based on the path delay data received at step 110 and the path delay acquired at step 111. Consider that the intermediate node N computes path delay asymmetry. A signalling message received from an upstream node (N−1) carries a path delay asymmetry value=A(N−1). Node N calculates a new accumulated path delay asymmetry value:

$$A(N)=A(N-1)+(d_{mf}+d_{fecf}+d_{ff})-(d_{mr}+d_{fecr}+d_{fr}).$$

The value A(N) is inserted in the path message going to the downstream node (N+1).

Step 117 sends the signalling message to a downstream node of the traffic path. This is the next node (N3 or N4) along the traffic path. Advantageously, the message is only sent to the next downstream node of the traffic path, and is not sent to any other nodes.

The method can comprise a step 118 of receiving a signalling message which has been returned via downstream nodes of the traffic path which carries path delay data contributed by the downstream nodes. At step 119 the ingress node forwards the signalling message to the upstream node of the traffic path.

Figure 6A:
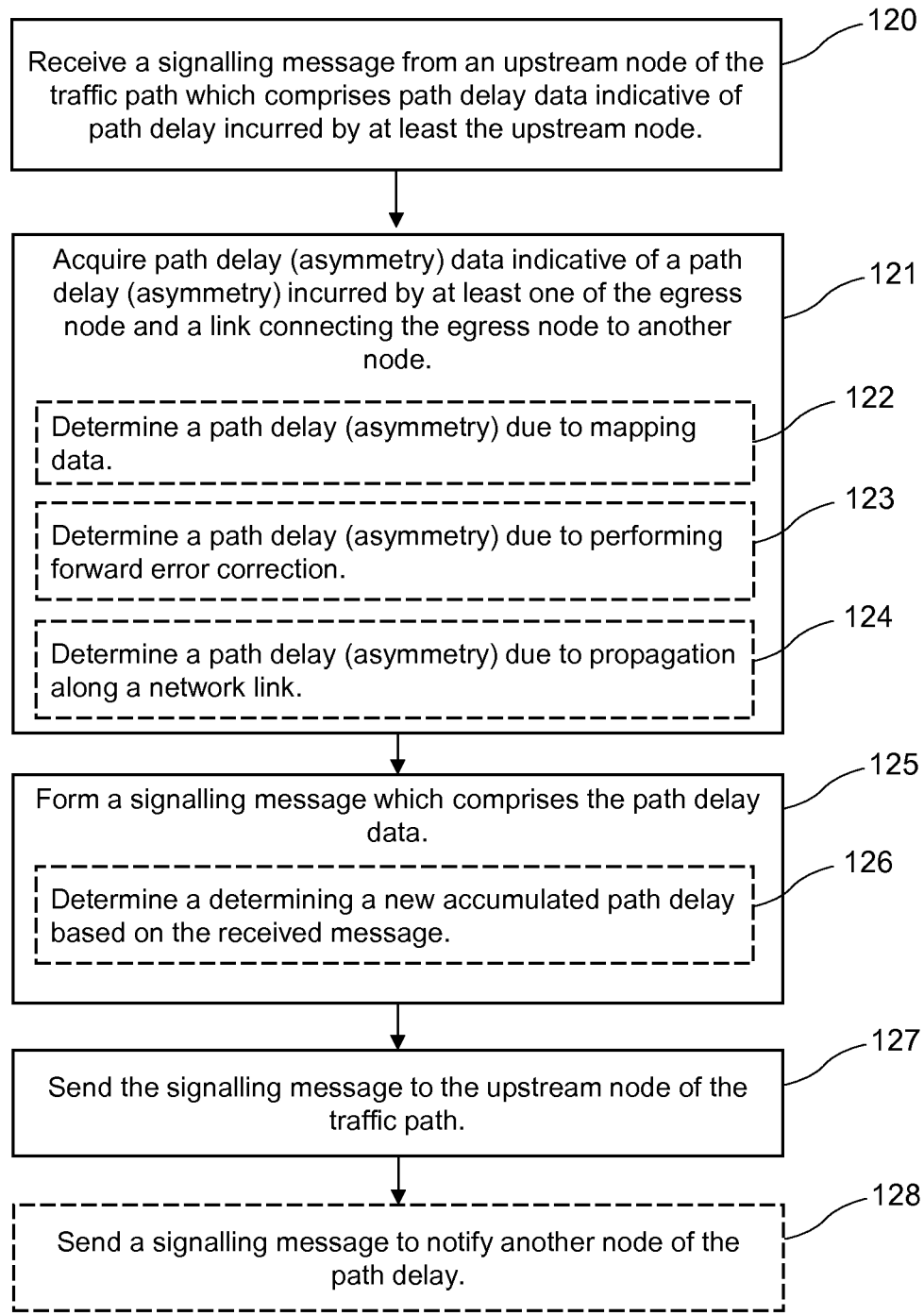
FIG. 6A shows a method performed by an egress node.
Figure 6B:
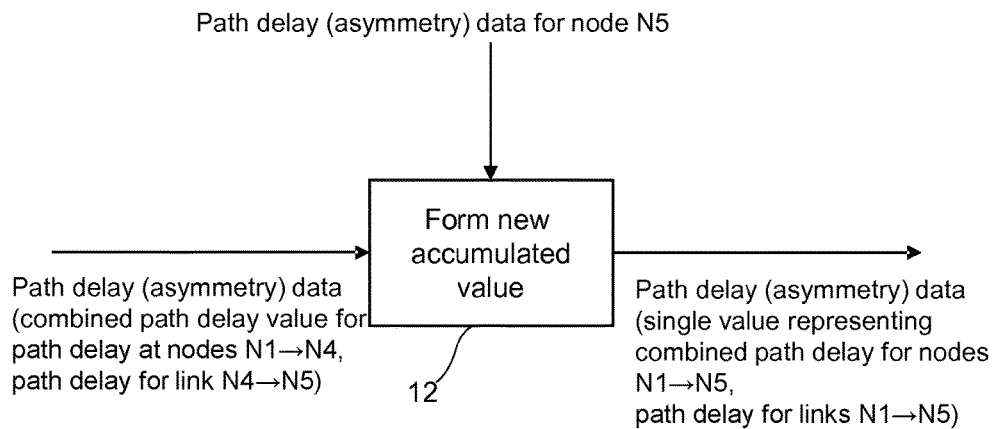
FIGS. 6B and 6C show operations performed by an egress node.
Figure 6C:
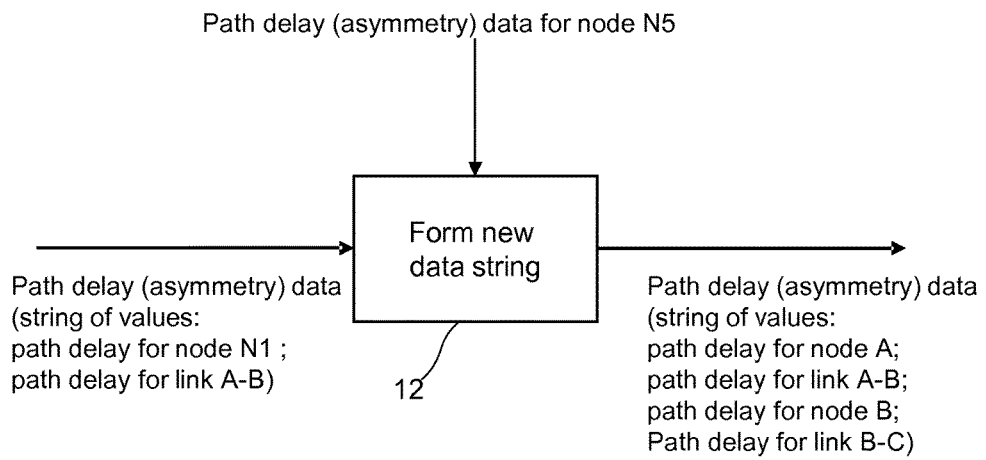

FIGS. 6A-6C show the method performed at an egress node N4, 14. At step 120 of the method the egress node receives a signalling message from an upstream node of the traffic path which comprises path delay data indicative of path delay incurred by at least the upstream node. At step 121, the egress node acquires path delay (asymmetry) data indicative of a path delay (asymmetry) incurred by at least one of the egress node and a link connecting the egress node to another node. Step 121 can comprise a step 122 of determining a path delay (asymmetry) due to mapping data. Step 121 can comprise a step 123 of determining a path delay (asymmetry) due to performing forward error correction. Step 121 can comprise a step 124 of determining a path delay (asymmetry) due to propagation along a network link.

Step 125 forms a signalling message which comprises the path delay data. Step 115 can comprise a step 116 of determining a new accumulated path delay based on the path delay data received at step 110 and the path delay acquired at step 111.

Optionally, step 128 can send a signalling message to notify another node of the path delay, such as a node of a client network connected to network 4.

Frequency of the RSVP Refresh Mechanism

The calculation and distribution of path delay data (path delay asymmetry data) can be performed when a traffic path (LSP) is set up and can be performed in response to major changes in the network such as Link Protection, fibre maintenance changing the length of a fibre. Such events may occur as infrequently as once per month or a few times per year. During these events, an alarm may be sent to the client node to indicate that path delay data (path delay asymmetry data) is being updated and the client is recommended to enter a holdover state while updates path delay data is collected for the traffic path.

It is possible to collect updated path delay data using an RSVP-TE refresh mechanism. Periodically, new RSVP-TE Path and Resv messages can be exchanged between the nodes and if any asymmetry contribution changes it is possible to compute again the total value (that can be sent to NMS with a new notification). Further signalling messages are sent as described above.

The GMPLS network architecture comprises a network of Network Elements (NE) running a GMPLS protocol stack, which forms the control plane (6, FIG. 2). RSVP-TE is a signalling protocol used in GMPLS. Path delay data (path delay asymmetry data) can be carried in a new object. The new object can be called "Circuit Asymmetry" and can be carried within RSVP-TE Path and Resv messages. It is processed and updated in path messages and forwarded unchanged in Resv messages as described above. FIG. 7A shows an RSVP-TE object structure defined in RFC 2205. The new Circuit Asymmetry object can be realised, as shown in FIG. 7B, with:

Length=8(4 header bytes and 4 bytes for the object content);

Class-Num=188 (or any other value reserved for private use, as described in http://www.iana.org/assignments/rsvp-parameters/rsvp-parameters.xml);

C-type=1 (any value. For example, 1 may be defined as Circuit Asymmetry expressed in picoseconds);

Object content=a 32 bit integer (meaning from −2,147,483,648 psec to 2,147,483,647 psec in case of C-Type=1).

Figure 8:
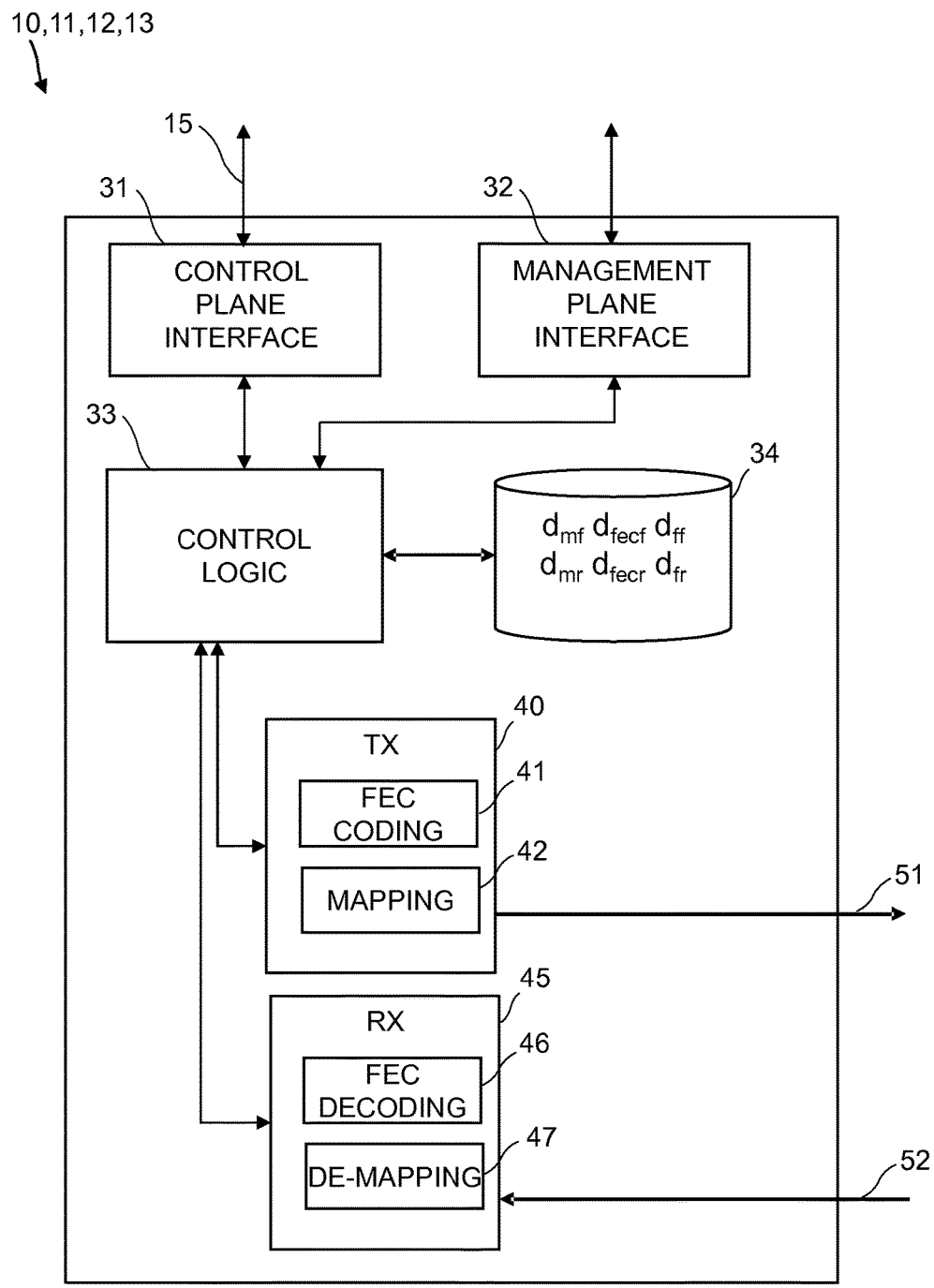
FIG. 8 shows apparatus at a node of the communications network.

FIG. 8 shows apparatus provided at one of the nodes 10-13. Control logic 33 controls operation of the node. Storage 34 is provided for storing path delay data for the node. A control plane interface 31 is provided for allowing the node to communicate with other nodes via the control plane (6, FIG. 2). A management plane interface 32 is provided for allowing the node to communicate with a Network Management System (NMS) 70 in the management plane. Node 10 comprises a transmitter 40 which is connected to an optical link 51 and a receiver 45 which is connected to an optical link 52. The transmitter 40 comprises a FEC coding module 41 for performing FEC coding of a data signal and a mapping module 42 for mapping data packets/frames into OTN containers. The receiver 45 comprises a FEC decoding module 46 for performing FEC decoding of a received data signal and a de-mapping module 47 for de-mapping data packets/frames from OTN containers. Control logic 33 communicates with the transmitter 40 and the receiver 45 to obtain data about delay due to mapping/de-mapping and FEC coding/decoding. Node 10 can also be arranged to make measurements of path delay asymmetry between forward and reverse transmission directions.

Figure 9A:
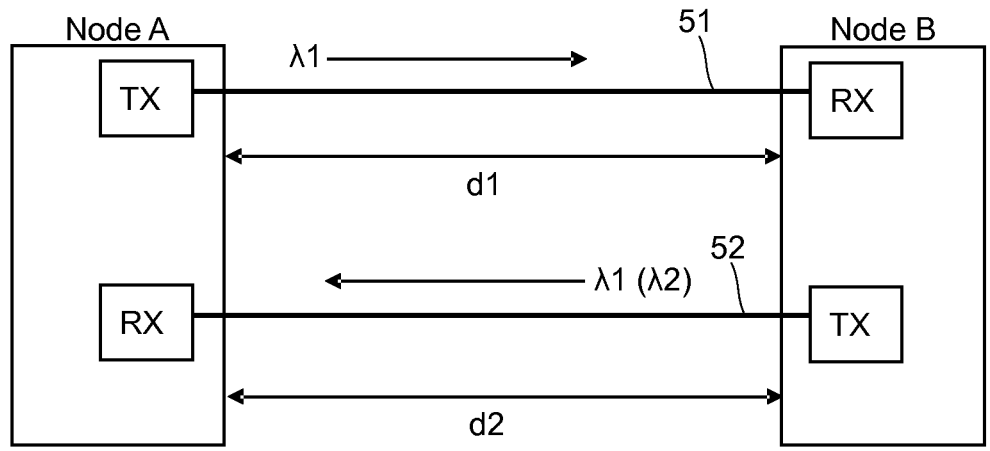
FIGS. 9A and 9B show ways of providing forward and reverse paths between a pair of nodes.
Figure 9B:
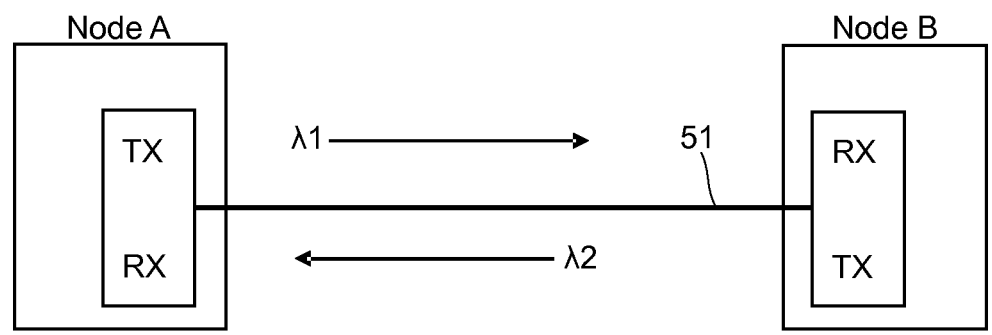

FIGS. 9A and 9B show two possible ways in which traffic can be carried over the optical communications network 4, between a pair of nodes A, B. In FIG. 9A there are separate optical links 51, 52 for each direction of communication: a first link 51 for carrying traffic in the forward direction of communication (A-B) and a second link 52 for carrying traffic in the reverse direction of communication (B-A). Each optical link 51, 52 can be a separate fibre which can follow a physically separate path. The length, d1, of link 51 can be different from the length, d2, of link 52. The same wavelength, λ1, can be used to carry traffic over the links 51 and 52, or different wavelengths can be used to carry traffic over the links 51 and 52, such as wavelength λ1 over the link 51 and wavelength λ2 over the link 52.

In FIG. 9B one link 51 is used for both directions of communication. A first wavelength, λ1, is used for carrying traffic in the forward direction of communication (A-B) and a second wavelength, λ2, is used for carrying traffic in the reverse direction of communication (B-A).

The time protocol (e.g. PTP) assumes that path delays in the forward and reverse directions are equal but the optical communications network 4 may cause different path delays in the forward and reverse directions, which can affect time synchronisation. One cause of asymmetry is propagation delay asymmetry. In FIG. 9A, different lengths of the links 51, 52 can cause a propagation delay asymmetry. If different wavelengths λ1, λ2 are used in FIG. 9A, this can cause a propagation delay asymmetry, even if the physical length of paths 51, 52 is the same. In FIG. 9B, different wavelengths λ1, λ2 used for the forward and reverse directions in the same optical link can cause a propagation delay asymmetry. As described above, propagation delay in the forward direction can be stored as a quantity "$d_{ff}$" and propagation delay in the reverse direction can be stored as a quantity "$d_{fr}$".

Figure 10:
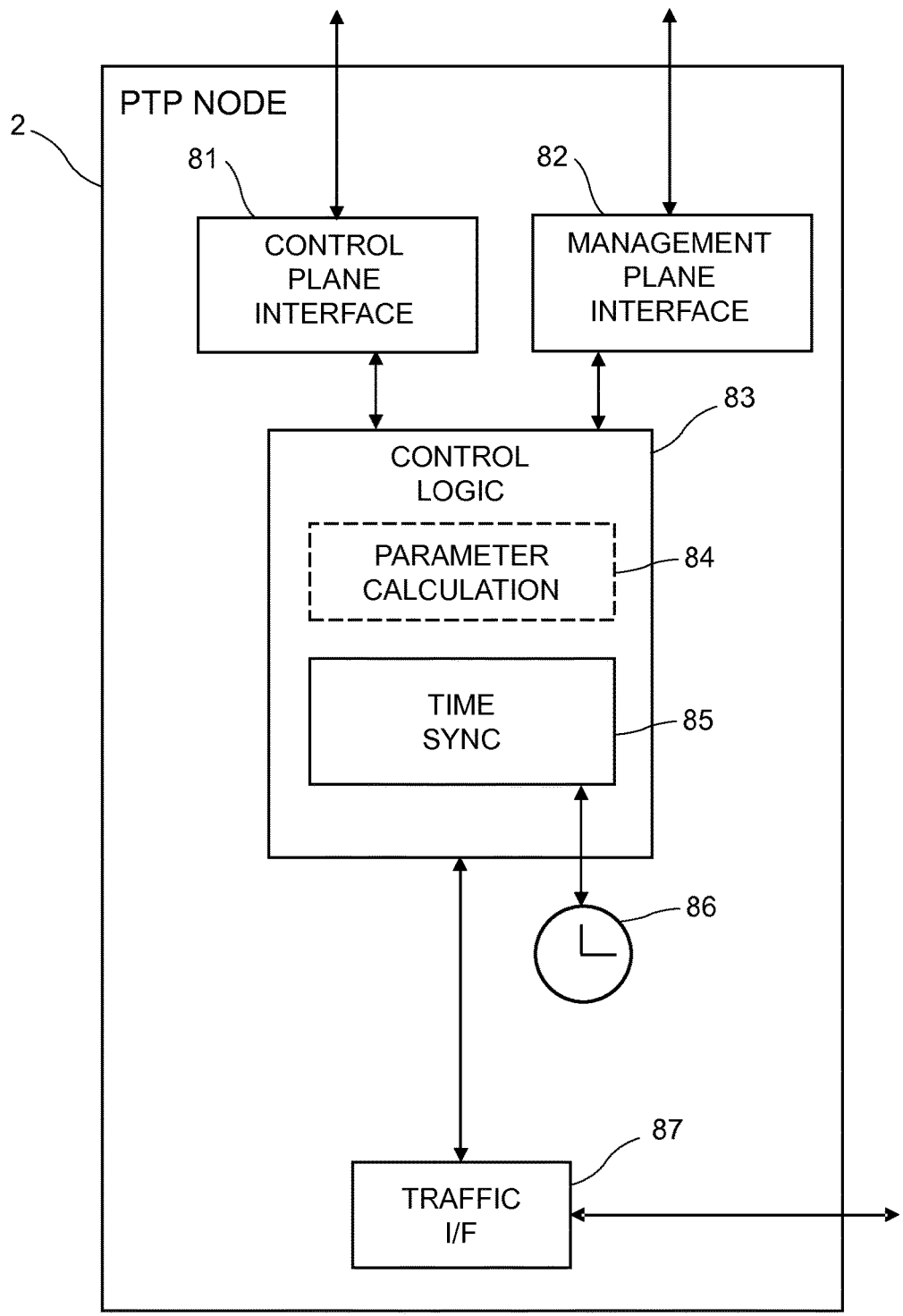
FIG. 10 shows a node for participating in time synchronisation.

FIG. 10 shows apparatus provided at a slave node 2 which can synchronise with a master node using a time protocol such as PTP. Control logic 83 includes a module 85 which performs time synchronisation. The node synchronises a local clock 86 with a master clock by exchanging signalling messages with another node. Time sync module 85 will use path delay asymmetry data to compensate for an asymmetry between forward and reverse paths between the master node and slave node. Path delay asymmetry data representing a path asymmetry over the network 4 can be collected as described above and received at the node 2 via a control plane interface 81 or a management plane interface 82. A parameter calculation module 84 can calculate an asymmetry parameter based on path delay data received from network 4, or a NMS of the client network.

Figure 11:
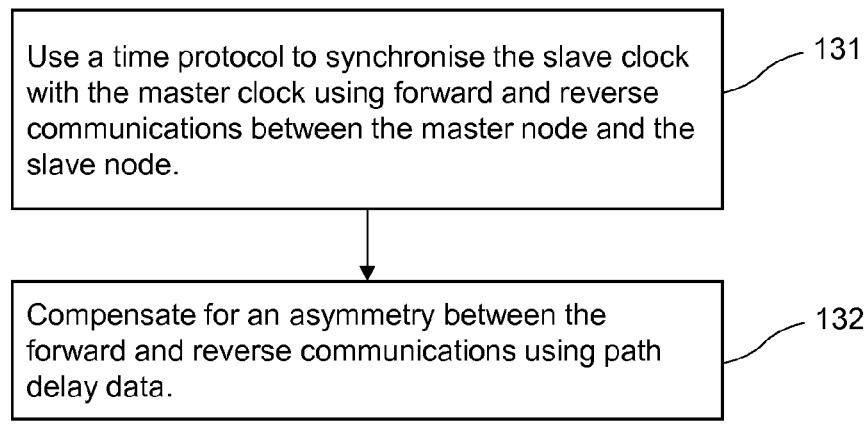
FIG. 11 shows a method performed at the node of FIG. 10.

FIG. 11 shows a method performed at node 2. Step 131 uses a time protocol to synchronise the slave clock with the master clock using forward and reverse communications between the master node and the slave node. Step 132 compensates for an asymmetry between the forward and reverse communications using path delay data which has been distributed in one of the ways described above.

Figure 12:
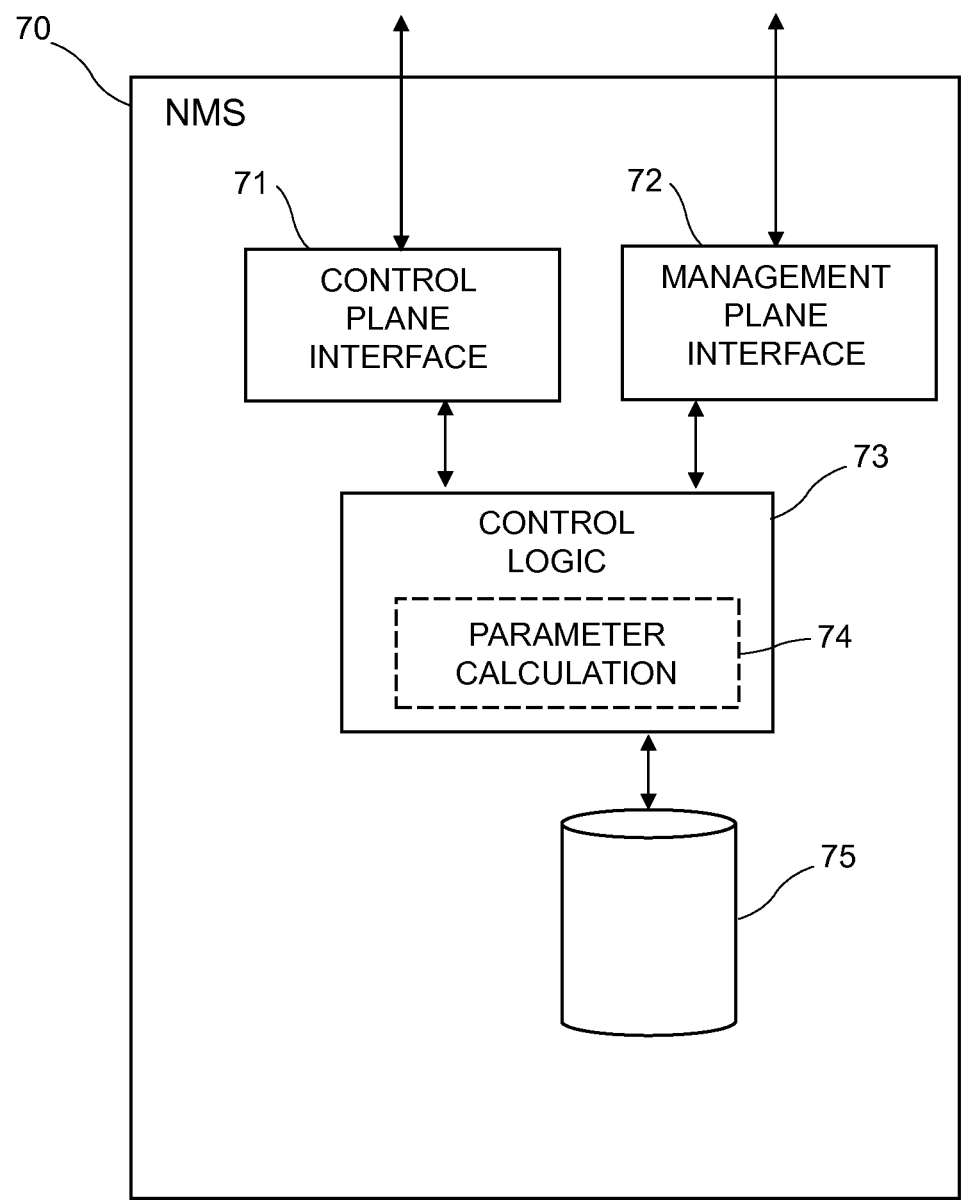
FIG. 12 shows apparatus at a NMS.

FIG. 12 shows apparatus provided at a NMS 70. Control logic 73 connects to storage 75. Path delay data acquired from nodes in network 4 can be stored in storage 75. A parameter calculation module 74 can calculate an asymmetry parameter based on path delay data received from a node of network 4. A control plane interface 71 and a management plane interface 72 are provided for allowing the NMS to communicate with other nodes, such as nodes 10-13. The NMS may also communicate with the NMS of another domain, such as a client NMS or an NMS of another operator, and may forward path delay data.

Figure 13:
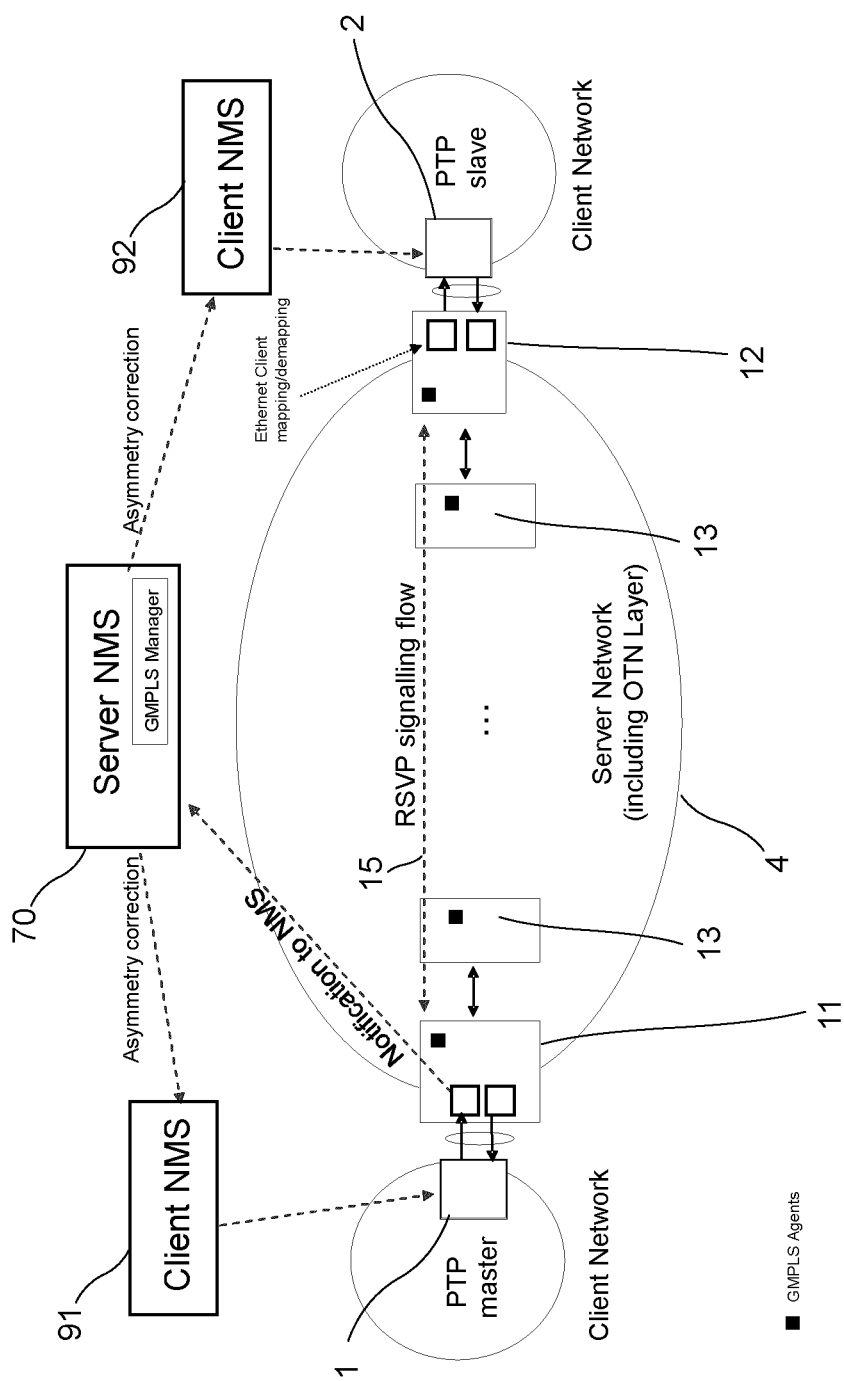
FIG. 13 shows a client-server communications system with path delay data forwarded via a NMS.
Figure 14:
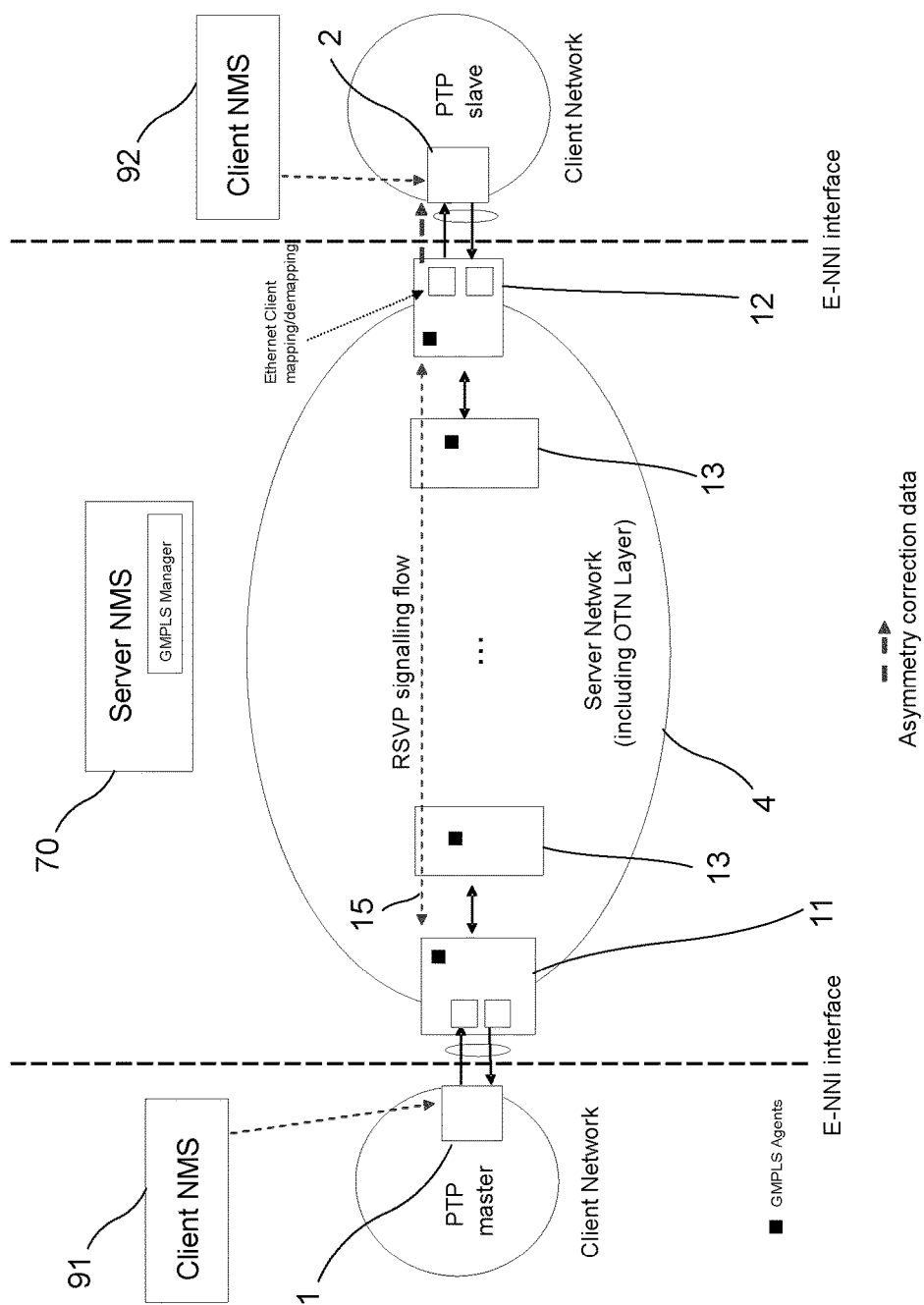
FIG. 14 shows a client-server communications system with path delay data forwarded via a client-server interface.

FIGS. 13 and 14 show examples of a communications system comprising client networks and a server communications network, such as the optical communications network 4 previously described. The communications system comprises a server NMS 70 and a client NMS 91, 92. The first client node 1 is coupled to the server network 4 through a first border node (=ingress node) 11 of the server network. The first border node 11 is arranged to map client traffic into a form for transmission over the server network. A second border node (=egress node) 12 of the server network connects to the client network. Traffic is carried between the ingress node 11 and egress node 12 via intermediate nodes 13. In the system of FIG. 13, time synchronisation can be performed between a master clock at the first client node 1 and a slave clock at the second client node 2 across the server communications network 4. An asymmetry is calculated between the forward and reverse directions of the overall paths between client nodes 1, 2, and used to compensate time synchronisation at the second client node 2. Path delay asymmetry data is collected by RSVP-TE signalling 15 between nodes of the traffic path, as described above. The path delay asymmetry data is used to compensate for the asymmetry. In FIG. 13, node 11 forwards path delay data (path delay asymmetry data) to the server NMS 70 via a suitable protocol. The server NMS 70 can communicate with a client NMS 92. The server NMS 70 can provide path delay data, which indicates the path delay asymmetry, to the client NMS 92.

FIG. 14 shows another system comprising a client network and a server communications network including an OTN layer, such as the optical communications network 4 previously described. In this system, egress node 12 of the server network forwards path delay data (path delay asymmetry data) across an External Network-Network Interface (E-NNI) to the second client node 94. FIG. 14 may apply in case of a multi-domain control plane (in a multi-vendor/operator scenario). The GMPLS stack can be used to directly exchange Delay Asymmetry values between the borders nodes (E-NNI is used to provide inter-domain parameter dissemination).

If the path delay data is in the form of a list of component path delay values, then an entity in the server network 4 (e.g. parameter calculation module 74 at the NMS 70) or an entity in the client network (e.g. parameter calculation module 84 at node 2) can calculate a path delay asymmetry based on the list of component path delay values.

As described above, asymmetry at each node (plus forward and reverse fibres connected to that node) can be calculated from the component delays described above, as:

$$A = (d_{mf} + d_{fecf} + d_{ff}) - (d_{mr} + d_{fecr} + d_{fr})$$

For the full traffic path, path delay asymmetries at every node and link are summed. This summation may occur as part of the collection (FIG. 3B), or calculation of an overall path delay asymmetry value can be performed by separate entity. In the case of PTP (IEEE 1588) a delayAsymmetry attribute is defined. This is half of the quantity A (for the entire traffic path):

delayAsymmetry=A/2

Note: there can be other "deterministic" sources of asymmetries (e.g. different rates on the egress and ingress lines) that may need to be taken into account in the delayAsymmetry calculation performed by the PTP client node. Once the delayAsymmetry is calculated, this can be made available to the function that processes the PTP packets as to properly update the correction fields as specified in IEEE 1588.

Handling of Asynchronous Clocks

A variable mapping delay can occur due to the fact that clocks in an OTN network are asynchronous and the data can slowly change position in the mapping buffers of the OTN network, thus resulting in periodic justifications. If the frequency of the justifications is lower than the filtering capability of the desynchroniser, there could be significant impacts on the phase noise and therefore delays and resulting asymmetries on the client signals. For example, 1 Gbit/s rate in case of 1 ppb clock difference, would result in a justification with a periodicity in the order of 10 seconds, which is significantly lower frequency then the desynchroniser bandwidth (typically in the order of 100 Hz). This would result in additional tens of ns variable asymmetry produced by the OTN network that might be desirable to control.

Asynchronous clocks used at network nodes 11, 12, 13 can cause mapping delay to vary over time and therefore path delay asymmetry to vary over time. Mapping of client signals to/from OTN data units occurs at ingress nodes and egress nodes. Mapping due to ODU multiplexing can occur in any of nodes 11-13, that is anywhere a Lower Order Protocol Data Unit (LO PDUk) is mapped to/from a Higher Order Optical Channel Data Unit (HO ODUk).

Monitoring of justification occasions in the mapping/multiplexing can be used to control the impact of variable delays and asymmetries due to justification. Advantageously, a period between justifications introduced by the mapper or multiplexing stage should occur be less than the period between two RSVP-TE signalling exchanges to update path delay data.

Advantageously, additional information can be used to predict the behaviour of the path delay over time, between the occasions when signalling determines the actual path delay values. This is particularly useful in situations where justifications occur more frequently than the signalling exchanges.

If an asynchronous clock generates frequent justification opportunities, a mapper can record in a table the number of justifications and the time when they are required. When a signalling message (e.g. RSVP-TE message described above) is sent from a node, it is possible to send, together with the current value of path delay, some additional information that can be used to predict the variation of the delay over time (e.g. number of justifications over time, their variation over time, which corresponds to the absolute frequency offset and to the linear drift of the frequency deviation respectively.) This additional information can be used to predict the behaviour of the delay over time, between the occasions when signalling determines the actual path delay values.

There are various cases depending on the signal that is mapped and the mapping procedure (AMP or GMP). Two examples are described. In the first example, four ODU1 signals are multiplexed into an OPU2 signal via an ODTUG2. In the second example a Gigabit Ethernet (GbE, 1000BaseX) signal is mapped into ODU0 and the ODU0 is multiplexed to a HO ODUk container (one or more orders of multiplexing is considered).

EXAMPLE 1

Four ODU1 signals are multiplexed into an OPU2 signal via the ODTUG2. An ODU1 signal is extended with frame alignment overhead and asynchronously mapped into the Optical channel Data Tributary Unit 1 into 2 (ODTU12) using the AMP justification overhead (JOH). The four ODTU12 signals are time-division multiplexed into the Optical channel Data Tributary Unit 2 (ODTUG2) with payload type 20, after which this signal is mapped into the OPU2. A byte of the ODU1 signal is mapped into an information byte of the ODTU12. Twice per 8 OPU2 frames, it is possible to perform either a positive or a negative justification action. This means that, in this example, phase steps of about 7 ns would be implied by the justification. If these are slower than the time constant of the desynchroniser (i.e. period higher than about 2 ms, that would mean about 4 ppm frequency difference) which would impact the phase noise on the output of the network.

EXAMPLE 2

GbE Mapping into ODU0 is performed according to G.709 clause 17.7.1. At first the GbE rate (1.250 Gb/s±100 ppm or ±4.6 ppm for SyncE) is reduced via TTT (=Timing Transparent Transcoding) down to 1.171875 Gb/s, then this is managed as a Continuous Bit Rate (CBR) and mapped into the OPU0 via GMP, allocating all the needed stuffing bytes according to the GMP algorithm. The number of available 8-bit (byte) locations in the OPU0 is 15232. The number of necessary locations can change frame per frame according to the actual misalignment between the client and the server frequencies which are varying in real time. In fact the GMP accommodation process decides the number of needed locations ($C_n$) in frame #i, insert this information in the OPU OH frame #i and then put the relevant $C_n$ client data in the frame #i+1. The number $C_n$ of needed locations depends on the relation between $f_{server}$ and $f_{client}$ and it can vary as follows:

$C_n$=14405÷14410 (with $f_{client}$ at ±100 ppm and $f_{server}$ at ±20 ppm)

$C_n$=14406÷14408 (with $f_{client}$ at ±4.6 ppm and $f_{server}$ at ±20 ppm)

This means that the number of bytes which is needed to store is at maximum 5 in the first case and 2 in the second case. At the demapper no delay has to be accounted because the extraction information is provided in the frame #i for the next frame #i+1. Therefore, in summary, we have:

GMP Mapping delay (+/−100 ppm): 5 bytes (≅32 ns at 1 GbE rate)

GMP Mapping delay (+/−4.6 ppm): 2 bytes (≅13 ns at 1 GbE rate)

GMP Demapping delay: 0 byte no delay

This delay is therefore due to the variation of the needed justification opportunities foreseen by the GMP process when a GbE is mapped, according to the standard, into and OPU0/ODU0 container. Necessarily after this, the ODU0 has to be multiplexed together with other LO containers into an HO ODUk (one or more level of multiplexing are theoretically possible). In any case, not depending on the type of multiplexing (ODU0 into ODTU01 or ODU0 into ODTUk.ts or, in general, ODUj into ODTUjk or ODUj into ODTUk.ts), this operation implies at maximum two additional justification opportunities which are approximately 13 ns at 1 GbE rate (please note that an exception is only the mapping of an ODU2e into an HO ODUk which potentially requires more justification opportunities (4/5 bytes), but this is not applicable to the case of GbE which is never mapped via ODU2e.

Information related to the justification opportunities (both via AMP or GMP) is calculated by the hardware and stored in the OPU OH in each node where a signal mapping or multiplexing is performed. By monitoring and recording the number of justifications over certain time windows, it is possible to:

estimate in real time the frequency offset between the clocks;

estimate how fast the frequency offset varies in the time (to evaluate if the variation can be managed);

request updates of asymmetry information under certain conditions, e.g. if the frequency of the justifications is 5 minutes, it could be requested to refresh RSVP-TE exchange every minute.

signal the precision of such estimate so that the end application is aware of the potential error in the time distribution chain. This information is used by the PTP clients (PTP slave).

The frequency of updates, and therefore the interval between performing iterations of the method of obtaining path delay data, can be a parameter to be configured by the network operator or it can be related to monitoring the frequency of the justifications. As the estimation of the frequency offset between clocks may present some errors it is always recommended to have an exchange of RSVP-TE more often than the rate of the justification. For example, ten times more frequent. Typically there is an upper limit on frequency of sending messages (e.g. not more often than one packet per minute). The method of obtaining path delay data is performed repeatedly during operation of a traffic path and a period between iterations of the method is less than a period between justification events in the network.

In general, assuming that the refresh of the RSVP-TE method is done at most every 1 min and assuming that the output clock signal is automatically filtered for variation faster than 2 ms, all the phase noise due to mapping justifications variation would be present on the outgoing signal only if the frequency of the justifications is below a few minutes min and above 2 ms.

The above method also allows estimating the overall frequency variation of the justification occasions in each node where a mapping or multiplexing is required. It is therefore possible to communicate via RSVP-TE not only the delay variation due to justification, but also the estimated derivative of the frequency variation in order to predict how the delay will vary in the time between two consecutive RSVP-TE updates.

Alternative Methods for Collecting/Distributing Path Delay Data

In the methods described above a signalling message is forwarded between nodes of a traffic path and path delay data is collected as the message is forwarded. Some alternative ways of collecting path delay data will now be described.

Figure 15:
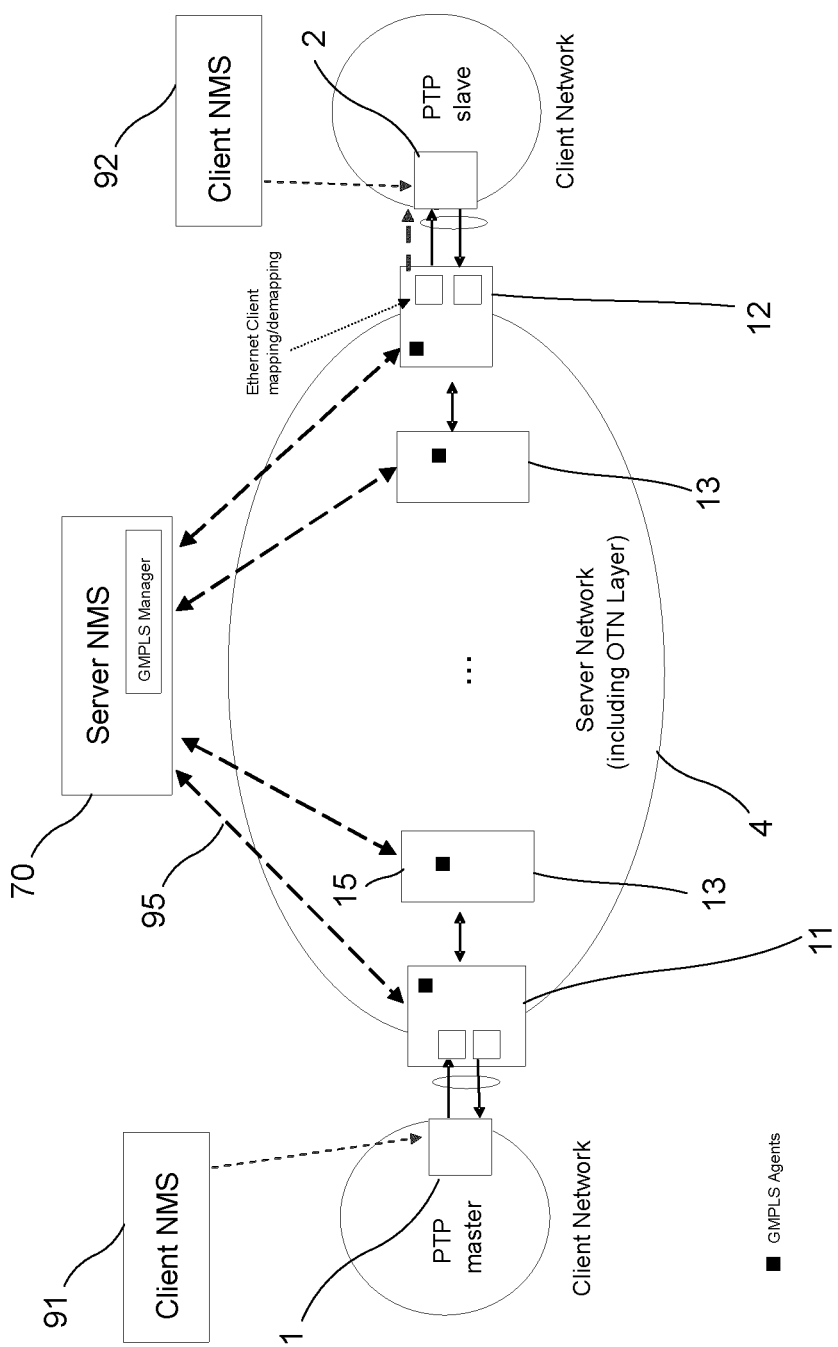
FIG. 15 shows another way of obtaining path delay data from nodes of the communications network.

Another method of obtaining path delay data from nodes of the communications network 4 is shown in FIG. 15. There is signalling 95 between the NMS 70 and each of the nodes 11, 12, 13 of network 4. NMS 70 can individually send a request to each node 11, 12, 13. In response to receiving the request, the node acquires path delay data indicative of a path delay incurred by at least one of the node and a link connecting the node to another node. The node forms a signalling message which comprises the path delay data and sends the signalling message to the NMS 70. NMS 70 can determine a path delay (or path delay asymmetry) for a particular traffic path across network 4 based on the received path delay data. If a node 10-13 does not have the capability to compute a propagation delay based on measurements made by the node then the node can send measurements, or the results of intermediate calculations, to the NMS and the NMS 70 can perform the calculation of propagation delay (or asymmetry in propagation delay).

Figure 16:
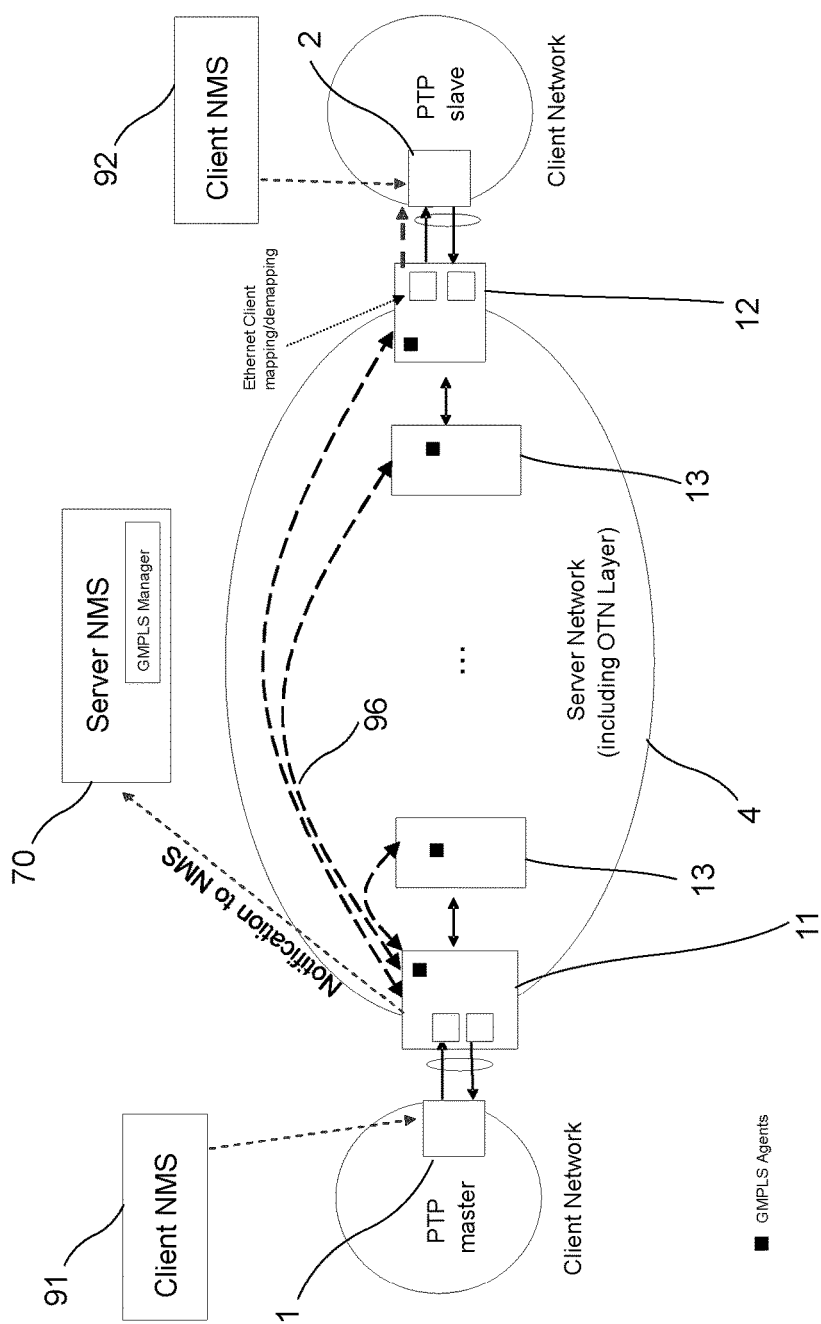
FIG. 16 shows another way of obtaining path delay data from nodes of the communications network.

Another method of obtaining path delay data from nodes of the communications network 4 is shown in FIG. 16. There is signalling 96 between the ingress node 11 of the traffic path and each of the other nodes 12, 13 of the traffic path across the network 4. Ingress node 11 can individually send a request to each node 12, 13. In response to receiving the request, the node acquires path delay data indicative of a path delay incurred by at least one of the node and a link connecting the node to another node. The node forms a signalling message which comprises the path delay data and sends the signalling message to the ingress node 11. Ingress node 11 can determine a path delay (or path delay asymmetry) for a particular traffic path across network 4 based on the received path delay data. If a node 10-13 does not have the capability to compute a propagation delay based on measurements made by the node then the node can send measurements, or the results of intermediate calculations, to another entity such as the NMS for performing the calculation of propagation delay (or asymmetry in propagation delay). The signalling 96 shown in FIG. 16 can be carried over the control plane.

The methods described above can be combined with any of the features of the earlier described methods.

Figure 17:
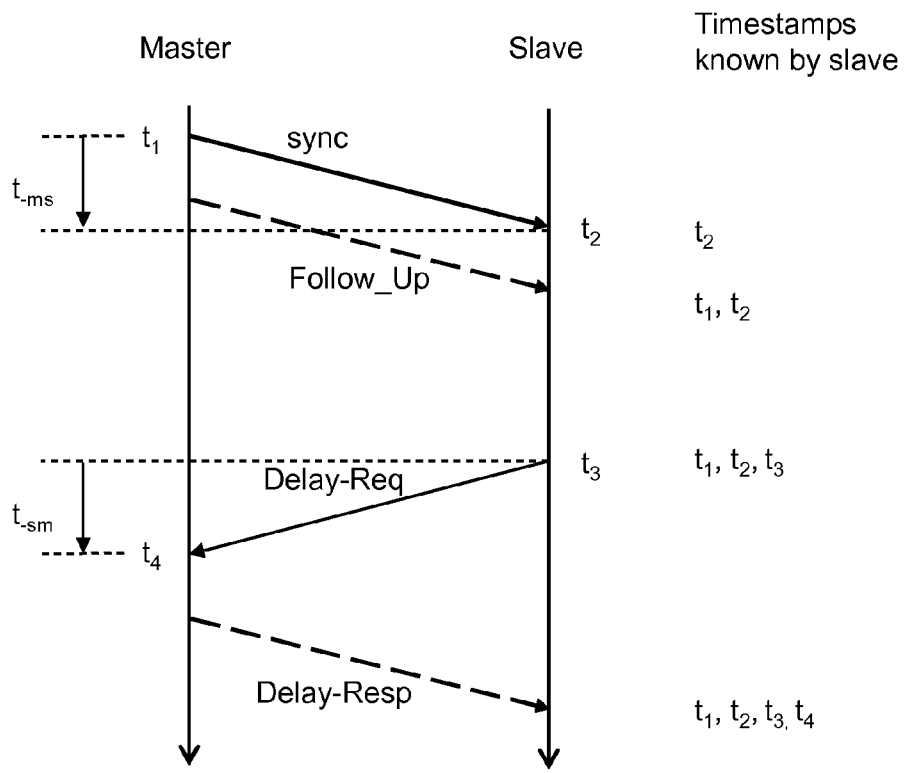
FIG. 17 shows a message exchange for time synchronisation protocol according to PTP.

FIG. 17 shows an example of a message exchange according to the PTP protocol for synchronising a slave clock with a master clock. The message exchange pattern is:

The master sends a Sync message to the slave and notes the time, t1, at which it was sent.

The slave receives the Sync message and notes the time of reception, t2.

The master conveys to the slave the timestamp t1 by embedding the timestamp t1 in the Sync message. This requires some sort of hardware processing for highest accuracy and precision. Alternatively, the master can embed the timestamp t1 in a Follow_Up message.

The slave sends a Delay_Req message to the master and notes the time, t3, at which it was sent.

The master receives the Delay_Req message and notes the time of reception, t4.

The master conveys to the slave the timestamp t4 by embedding it in a Delay_Resp message.

At the conclusion of this exchange of messages, the slave possesses all four timestamps: t1, t2, t3, t4. These timestamps may be used to compute the offset of the slave's clock with respect to the master and the mean propagation time of messages between the two clocks, which in FIG. 17 is the mean of t-ms and t-sm. The slave shall synchronise to its master via the minimisation of the <offsetFromMaster> value computed by the slave.

The time error between a slave and master ordinary or boundary clock (<offsetFromMaster>) is defined as:

$$<\text{offsetFromMaster}>=<\text{Time on the slave clock}>-<\text{Time on the master clock}>$$

where all times are measured at the same instant. In particular, the <offsetFromMaster> value shall be computed by the slave as follows:

If a Follow_Up message will not be received, then $$<\text{offsetFromMaster}>=(t2-t1)-<\text{meanPathDelay}>-\text{correctionField of Sync message.}$$

If a Follow_Up message will be received, then $$<\text{offsetFromMaster}>=(t2-t1)-<\text{meanPathDelay}>-\text{correctionField of Sync message}-\text{correctionField of Follow\_Up message}$$

where correction field of Sync message relates to the support in the transport network (i.e. Transparent Clocks adding information on the latency for the packet crossing the transport network element).

The nominal value of the <meanPathDelay> is computed as $$<\text{meanPathDelay}>=[(t_2-t_1)+(t_4-t_3)]/2=[(t_2-t_3)+(t_4-t_1)]/2$$

The scheme is slightly different in case of Peer-to-Peer Transparent clocks where the Path delay is calculated at each hop and included in the correction field of the sync message (or Follow-up message in case of 2-steps clock) in addition to the latency.

From the above description it is clear that the computation of offset and propagation time assumes that the master-to-slave and slave-to-master propagation times are equal. Any asymmetry in propagation time introduces an error in the computed value of the clock offset. The computed mean propagation time differs from the actual propagation times due to the asymmetry.

If the delay Asymmetry of the path connected to the ingress port is known, the corrections can be made as specified by the PTP protocol (see section 11.6 of IEEE 1588-2008, IEEE Standard for a Precision Clock Synchronization Protocol for Network Measurement and Control System). In particular, IEEE 1588 defines the attribute "delayAsymmetry" as follows (see 7.4 in IEEE 1588); for t-ms and t-sm definitions:

$$t\text{-}ms = \langle meanPathDelay \rangle + delayAsymmetry$$

$$t\text{-}sm = \langle meanPathDelay \rangle - delayAsymmetry$$

In other words, delayAsymmetry is defined to be positive when the master-to-slave or responder-to requestor propagation time is longer than the slave-to-master or requestor-to-responder propagation time. The methods and apparatus described above allow the asymmetry to be calculated and therefore the term "delayAsymmetry" can include the asymmetry calculated between forward and reverse paths of the optical communications network.

Figure 18:
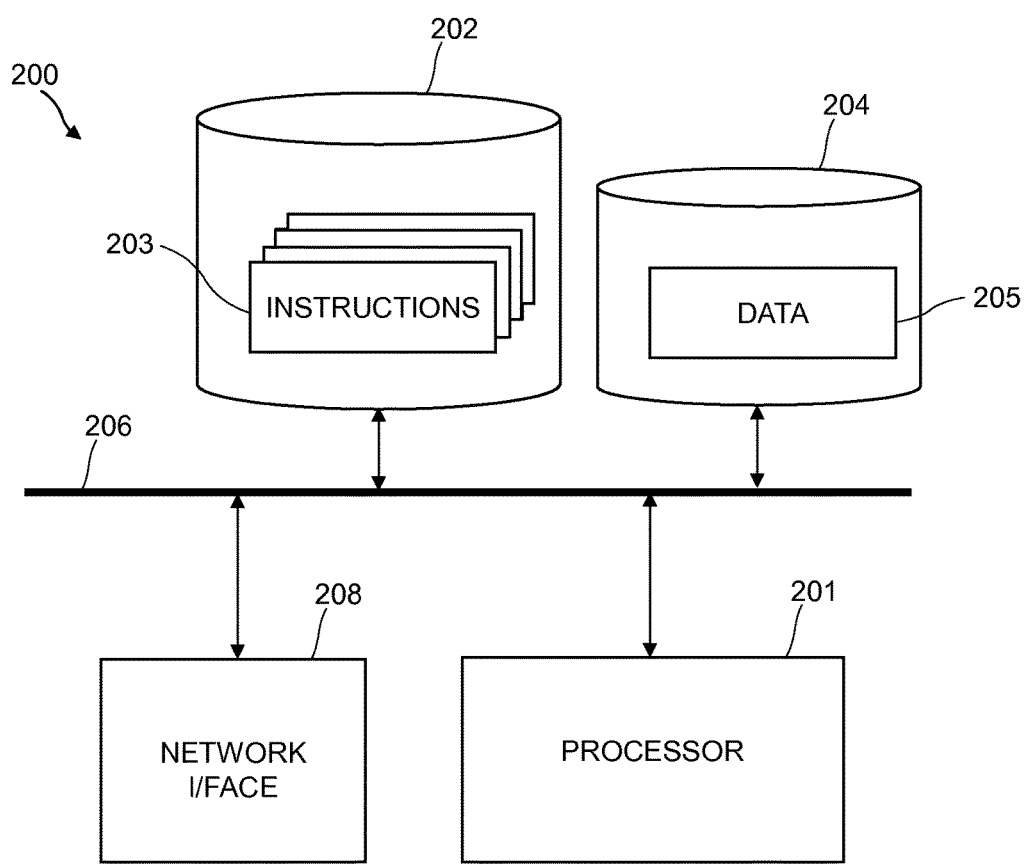
FIG. 18 shows processing apparatus for performing a computer-based implementation of the methods.

FIG. 18 shows an exemplary processing apparatus 200 which may be implemented as any form of a computing and/or electronic device, and in which embodiments of the system and methods described above may be implemented. Processing apparatus 200 can be provided at one of the nodes 10, or at a node 70 forming part of the network management system. Processing apparatus may implement the method shown in any of FIGS. 4A, 5A, 6A, 11. Processing apparatus 200 comprises one or more processors 201 which may be microprocessors, controllers or any other suitable type of processors for executing instructions to control the operation of the device. The processor 201 is connected to other components of the device via one or more buses 206. Processor-executable instructions 203 may be provided using any computer-readable media, such as memory 202. The processor-executable instructions 203 can comprise instructions for implementing the functionality of the described methods. The memory 202 is of any suitable type such as read-only memory (ROM), random access memory (RAM), a storage device of any type such as a magnetic or optical storage device. Additional memory 204 can be provided to store data 205 used by the processor 201. The processing apparatus 200 comprises one or more network interfaces 208 for interfacing with other network entities, such as other nodes 10 of the network 4.

Other Applications

One upcoming architectural change in mobile access network is the possibility to split conventional Radio Base Stations (RBS) in two parts: a Processing Main Unit (MU) and a set of antennas with dedicated RF equipment able to cover multiple radio cells (RRUs). A single MU is shared among multiple RRUs. This new architectural approach in the RBS implementation require high capacity, cost effective and low latency transport systems between MU (processing) and RRUs (antennas). Nowadays they are realized through the standard protocol CPRI, transmitted over P2P dedicated optical links. CPRI has pressing constraints in terms of latency and in particular in terms of uplink/downlink differential delay. Using WDM technologies as a transmission layer for CPRI could provide great benefits, in terms of efficient use of fibre and MU consolidation. As a drawback, compared with dedicated P2P fibre, accommodating uplink and downlink streams on different fibres and/or wavelengths can have a detrimental effect on the CPRI synchronisation. That effect increases with the length of the link(s), with the difference between the lengths of the two fibres (in case of two fibre systems) and with the wavelength spacing between uplink and downlink wavelengths. The knowledge of uplink and downlink propagation delay differences can be used to apply the proper compensation on the two CPRI streams so that the differential delay is reduced to less than an acceptable threshold value.

Modifications and other embodiments of the disclosed invention will come to mind to one skilled in the art having the benefit of the teachings presented in the foregoing descriptions and the associated drawings. Therefore, it is to be understood that the invention is not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method of distributing path delay data across a connection-oriented communications network comprising a plurality of interconnected nodes, the method comprising, at an intermediate node of a traffic path across the network:
   receiving a Resource Reservation Protocol-Traffic Engineering (RSVP-TE) control plane signalling message from an upstream node of the traffic path which comprises path delay data indicative of path delay incurred by at least the upstream node of the traffic path;
   acquiring path delay data indicative of a path delay for the traffic path incurred by at least one of the intermediate node and a link connecting the intermediate node to another node;
   forming a RSVP-TE control plane signalling message comprising the path delay data indicative of a path delay incurred by at least one of the intermediate node and a link connecting the intermediate node to another node;
   sending the RSVP-TE control plane signalling message to a downstream node of the traffic path;
   receiving a RSVP-TE control plane signalling message which has been returned via at least one downstream node of the traffic path which carries path delay data contributed by the downstream nodes; and
   forwarding the RSVP-TE control plane signalling message to the upstream node of the traffic path.

2. The method according to claim 1 wherein the path delay data in the received RSVP-TE control plane signalling message is indicative of an asymmetry in path delay between a forward transmission direction and a reverse transmission direction of the traffic path.

3. The method according to claim 1 wherein the path delay data in the received RSVP-TE control plane signalling message is an accumulated path delay for the traffic path and the method further comprises determining a new accumulated path delay based on the accumulated path delay data in the received RSVP-TE control plane signalling message and a path delay incurred by the intermediate node, and wherein the step of forming a RSVP-TE control plane signalling message forms a RSVP-TE control plane signalling message which includes the accumulated path delay.

4. The method according to claim 1 wherein the step of acquiring path delay data comprises at least one of:
determining a delay due to mapping data; determining a delay due to performing forward error correction; and determining a delay due to propagation along a network link.

5. The method according to claim 1 wherein the method is performed repeatedly during operation of the traffic path.

6. The method according to claim 5 wherein a source of variable path delay in the network is justification events caused by mapping signals and wherein a period between iterations of the method is less than a period between justification events occurring in the network.

7. The method according to claim 5 wherein a source of variable path delay in the network is justification events caused by mapping signals and the method further comprises determining information about behaviour of the variable path delay during the period between iterations of the method.

8. The method according to claim 1 which is performed for at least one of: establishment of the traffic path; in response to a change occurring in the traffic path; and expiry of a predetermined time interval.

9. A method of distributing path delay data across a connection-oriented communications network comprising a plurality of interconnected nodes, the method comprising, at an ingress node of a traffic path across the network:
acquiring path delay data indicative of a path delay for the traffic path incurred by at least one of the ingress node and a link connecting the ingress node to another node;
forming a Resource Reservation Protocol-Traffic Engineering (RSVP-TE) control plane signalling message which comprises the path delay data;
sending the RSVP-TE control plane signalling message only to a downstream node of the traffic path; and
receiving a RSVP-TE control plane signalling message which has been returned via downstream nodes of the traffic path which carries path delay data contributed by the downstream nodes.

10. The method according to claim 9 wherein the path delay data is path delay asymmetry data indicative of an asymmetry in path delay between a forward transmission direction and a reverse transmission direction of the traffic path.

11. A method of distributing path delay data across a connection-oriented communications network comprising a plurality of interconnected nodes, the method comprising, at an egress node of a traffic path across the network:
receiving a Resource Reservation Protocol-Traffic Engineering (RSVP-TE) control plane signalling message from an upstream node of the traffic path comprising path delay data indicative of path delay incurred by at least the upstream node;
acquiring path delay data indicative of a path delay for the traffic path incurred by at least one of the egress node and a link connecting the egress node to another node;
forming a RSVP-TE control plane signalling message comprising the path delay data indicative of a path delay incurred by at least one of the egress node and a link connecting the egress node to another node; and
sending the RSVP-TE control plane signalling message to the upstream node of the traffic path.

12. The method according to claim 11 wherein the path delay data in the received RSVP-TE control plane signalling message is indicative of an asymmetry in path delay between a forward transmission direction and a reverse transmission direction of the traffic path.

13. The method according to claim 11 wherein the path delay data in the received RSVP-TE control plane signalling message is an accumulated path delay for the traffic path and the method further comprises determining a new accumulated path delay based on the accumulated path delay data in the received RSVP-TE control plane signalling message and a path delay incurred by the egress node, and
wherein the step of forming a RSVP-TE control plane signalling message forms a RSVP-TE control plane signalling message which includes the accumulated path delay.

14. A method of performing time synchronisation between a master clock at a master node and a slave clock at a slave node across a communications network, the method comprising, at the slave node:
using a time protocol to synchronise the slave clock with the master clock using forward and reverse communications between the master node and the slave node; and
compensating for an asymmetry between the forward and reverse communications using path delay data which is acquired using the method according to claim 1.

15. An apparatus for use at an intermediate node of a traffic path in a connection-oriented communications network comprising a plurality of interconnected nodes for distributing path delay data across the connection-oriented communications network, the apparatus comprising:
a control plane interface, wherein the control plane interface is configured to communicate with other nodes of the traffic path; and
an operation controller, wherein the operation controller is arranged to:
receive a Resource Reservation Protocol-Traffic Engineering (RSVP-TE) control plane signalling message from an upstream node of the traffic path which comprises path delay data indicative of path delay incurred by at least the upstream node of the traffic path;
acquire path delay data for the traffic path indicative of a path delay incurred by at least one of the intermediate node and a link connecting the intermediate node to another node;
form a RSVP-TE control plane signalling message comprising the path delay data indicative of a path delay incurred by at least one of the intermediate node and a link connecting the intermediate node to another node;
send the RSVP-TE control plane signalling message to a downstream node of the traffic path;
receive a RSVP-TE control plane signalling message which has been returned via at least one downstream node of the traffic path which carries path delay data contributed by the downstream nodes; and
forward the RSVP-TE control plane signalling message to the upstream node of the traffic path.

16. An apparatus for use at an ingress node of a traffic path in a connection-oriented communications network comprising a plurality of interconnected nodes for distributing path delay data across the connection-oriented communications network, the apparatus comprising:
a control plane interface, wherein the control plane interface is configured to communicate with other nodes of the traffic path; and an operation controller, wherein the operation controller is arranged to:
  acquire path delay data for the traffic path indicative of a path delay incurred by at least one of the ingress node and a link connecting the ingress node to another node;
  form a Resource Reservation Protocol-Traffic Engineering (RSVP-TE) control plane signalling message which comprises the path delay data;
  send the RSVP-TE control plane signalling message only to a downstream node of the traffic path; and
  receive a RSVP-TE control plane signalling message which has been returned via downstream nodes of the traffic path which carries path delay data contributed by the downstream nodes.

17. An apparatus for use at an egress node of a traffic path in a connection-oriented communications network comprising a plurality of interconnected nodes for distributing path delay data across the connection-oriented communications network, the apparatus comprising:
  a control plane interface, wherein the control plane interface is configured to communicate with other nodes of the traffic path; and
  an operation controller, wherein the operation controller is arranged to:
    receive a Resource Reservation Protocol-Traffic Engineering (RSVP-TE) control plane signalling message from an upstream node of the traffic path comprising path delay data indicative of path delay incurred by at least the upstream node;
    acquire path delay data for the traffic path indicative of a path delay incurred by at least one of the egress node and a link connecting the egress node to another node;
    form a RSVP control plane signalling message comprising the path delay data indicative of a path delay incurred by at least one of the egress node and a link connecting the egress node to another node; and
    send the RSVP control plane signalling message to the upstream node of the traffic path.

18. A nontransitory machine-readable medium carrying instructions which, when executed by a processor, cause the processor to perform a method of distributing path delay data across a connection-oriented communications network comprising a plurality of interconnected nodes, the method comprising, at an intermediate node of a traffic path across the network:
  receiving a Resource Reservation Protocol-Traffic Engineering (RSVP-TE) control plane signalling message from an upstream node of the traffic path which comprises path delay data indicative of path delay incurred by at least the upstream node of the traffic path;
  acquiring path delay data indicative of a path delay for the traffic path incurred by at least one of the intermediate node and a link connecting the intermediate node to another node;
  forming a RSVP-TE control plane signalling message comprising the path delay data indicative of a path delay incurred by at least one of the intermediate node and a link connecting the intermediate node to another node;
  sending the RSVP-TE control plane signalling message to a downstream node of the traffic path;
  receiving a RSVP-TE control plane signalling message which has been returned via at least one downstream node of the traffic path which carries path delay data contributed by the downstream nodes; and
  forwarding the RSVP-TE control plane signalling message to the upstream node of the traffic path.

* * * * *